United States Patent [19]

Imura

[11] Patent Number: 5,905,917

[45] Date of Patent: May 18, 1999

[54] VIBRATION REDUCTION DEVICE

[75] Inventor: Yoshio Imura, Kawasaki, Japan

[73] Assignee: Nikon Corporation, Tokyo, Japan

[21] Appl. No.: 09/038,104

[22] Filed: Mar. 11, 1998

[30] Foreign Application Priority Data

Mar. 14, 1997 [JP] Japan .................................. 9-060404
Mar. 14, 1997 [JP] Japan .................................. 9-060405

[51] Int. Cl.⁶ .................................................. G03B 17/00
[52] U.S. Cl. ........................................................ 396/55
[58] Field of Search .............................. 396/55; 359/554; 348/208

[56] References Cited

U.S. PATENT DOCUMENTS 5,181,056 1/1993 Noguchi et al. ........................... 396/55
5,812,886 9/1998 Imura ....................................... 396/55

FOREIGN PATENT DOCUMENTS 4-34513 2/1992 Japan .
4-34514 2/1992 Japan .

Primary Examiner—W. B. Perkey

[57] ABSTRACT

A vibration reduction device includes a vibration reduction optical system which reduces vibration by its movement, a fixing portion which assumes a fixing state for fixing the vibration reduction optical system and a releasing state for releasing the vibration reduction optical system, a holding portion for holding/canceling the fixing state of the fixing portion, and a biasing portion for biasing the fixing portion from the fixing state in which the vibration reduction optical system is fixed to the releasing state in which the vibration reduction optical system is released. The biasing portion is interlocked with a releasing operation of the holding portion to release the vibration reduction optical system.

15 Claims, 13 Drawing Sheets

IV–IVA (IV–IVB)

V—V

VIBRATION REDUCTION DEVICE

The entire disclosure of Japanese Patent Application Nos. 9-060404 and 9-060405 including specifications, claims, drawings and summaries is incorporated herein by reference in their entirety.

BACKGROUND OF THE INVENTION

1. Field of the Invention

The present invention relates to a vibration reduction device for reducing vibration such as camera shake.

2. Related Background Art

Japanese Patent Application Laid-Open Nos. 4-34513 and 4-34514 disclose vibration reduction devices each including a vibration reduction lens, a lens holding member for holding the vibration correction lens, a fixing member which is switched between a fixing position and a releasing position to fix and release the lens holding member, a tension coil spring for biasing the fixing member from the releasing position to the fixing position, a locking member which is engaged/disengaged with/from the fixing member to lock/release the fixing member at the releasing position, and a motor for driving the fixing member from the fixing position to the releasing position. In this vibration reduction device, the locked fixing member is released by the locking member to be quickly driven from the releasing position to the fixing position by the biasing force of the tension coil spring.

In the above conventional vibration reduction device, when the lens holding member is to be switched from a releasing state to a fixing state, the fixing member is driven by the biasing force of the tension coil spring. As a result, the lens holding member can be quickly fixed by the fixing member. In the conventional vibration reduction device, however, when the lens holding member is to be switched from the fixing state to the releasing state, the fixing member must be driven from the fixing position to the releasing position by the motor against the biasing force of the tension coil spring. For this reason, the conventional vibration reduction device requires a large quantity of electrical energy to switch the lens holding member from the fixing state to the releasing state. In addition, in the conventional vibration reduction device, the time required to switch the lens holding member to the releasing state is not negligible, and it is difficult to quickly switch the lens holding member to the releasing state to quickly start vibration reduction. Consequently, when the conventional vibration reduction device is mounted in a single-lens reflex still camera, the release time lag becomes long, resulting in a considerable deterioration in operability.

In the conventional vibration reduction device, in the process of switching the lens holding member from the releasing state to the fixing state, the user sometimes wants to resume vibration reduction by switching the lens holding member to the releasing state again. In such a case, according to the conventional vibration reduction device, the fixing member is driven first to the fixing position against the biasing force of the tension coil spring, and is then driven from the fixing position to the releasing position using the motor. It is, therefore, difficult for the conventional vibration reduction device to quickly resume vibration reduction.

Assume that in the vibration reduction device having the above structure, the lens holding member is in the releasing state (during vibration reduction). In this state, when the power switch is turned off, or the power supply battery is removed, the engagement between the fixing member and the locking member is canceled by driving the locking member until the capacitor incorporated in the camera body is discharged. For this reason, when the conventional vibration reduction device is mounted on the interchangeable lens of a single-lens reflex camera, and the interchangeable lens is removed from the camera body incorporating a power supply battery and a capacitor, the motor and the locking member cannot be driven without a power supply.

SUMMARY OF THE INVENTION

It is an object of the present invention to provide a vibration reduction device with high operability which can quickly start vibration reduction by quickly switching a vibration reduction optical system from a fixed state to a released state.

It is another object of the present invention to provide a vibration reduction device which can fix a vibration reduction optical system with a fixing portion without any power supply.

A vibration reduction device according to the first mode of the present invention includes a vibration reduction optical system for reducing vibration, a fixing portion for fixing/releasing the vibration reduction optical system, a holding portion for holding/canceling a fixing state of the fixing portion, and a biasing portion interlocked with the releasing operation of the holding portion to bias the fixing portion so as to switch the vibration reduction optical system from the fixed state to the released state.

According to the first mode of the present invention, the holding portion cancels the fixing state of the fixing portion which fixes the vibration reduction optical system, and the biasing portion is interlocked with the releasing operation of the holding portion to bias the fixing portion so as to switch the vibration reduction optical system from the fixed state to the released state. With this operation, the vibration reduction optical system can be released within a very short period of time.

According to the second mode of the present invention, the vibration reduction device of the first mode includes a restoring portion for restoring the fixing portion so as to switch the vibration reduction optical system from the released state to the fixed state. The restoring portion charges the biasing force of the biasing portion upon interlocking with the restoring operation.

According to the second mode of the present invention, the restoring portion restores the fixing portion so as to switch the vibration reduction optical system from the released state to the fixed state, and the restoring portion is interlocked with the restoring operation to charge the biasing force of the biasing portion. With this operation, the biasing force for switching the vibration reduction optical system from the fixed state to the released state can be charged as the fixing portion is restored.

According to third mode of the present invention, in the vibration reduction device of the second mode, the biasing portion drives the fixing portion with mechanical energy, and the restoring portion charges the mechanical energy of the biasing portion while driving the fixing portion with electrical energy.

According to the third mode of the present invention, since the biasing portion drives the fixing portion with mechanical energy, the vibration reduction optical system can be switched from the fixing state to the releasing state without any power supply.

According to the fourth mode of the present invention, the vibration reduction device of the second or third mode includes a clutch portion for separating the fixing portion from the restoring portion to set the vibration reduction optical system in the released state.

According to the fourth mode of the present invention, the clutch portion can separate the fixing portion from the restoring portion. With this separating operation, the vibration reduction optical system can be quickly switched from the fixed state to the released state even during a restoring operation.

According to the fifth mode of the present invention, the vibration reduction device of any one of the first to fourth modes includes a releasing start signal generating unit for generating a releasing start signal, and the holding portion releases the fixing portion on the basis of the releasing start signal.

According to the fifth mode of the present invention, since the holding portion releases the fixing portion on the basis of a releasing start signal, the vibration reduction optical system in the fixed state can be set in the released state within a very short period of time.

According to the sixth mode of the present invention, the vibration reduction device of the fourth mode includes a fixing start signal generating unit for generating a fixing start signal, and the clutch portion connects the fixing portion to the restoring portion on the basis of the fixing start signal.

According to the sixth mode of the present invention, since the clutch portion connects the fixing portion to the restoring portion on the basis of the fixing start signal, the vibration reduction optical system can be quickly switched from the released state to the fixed state.

According to the seventh mode of the present invention, the vibration reduction device of the sixth mode includes a releasing start signal generating unit for generating a releasing start signal, and the clutch portion separates the fixing portion from the restoring portion on the basis of the releasing start signal.

According to the seventh mode of the present invention, since the clutch portion separates the fixing portion from the restoring portion on the basis of the releasing signal, the vibration reduction optical system can be set in the released state in the process of restoring the vibration reduction optical system from the released state to the fixed state.

According to the eighth mode of the present invention, the vibration reduction device of any one of the first to seventh modes includes a driving unit for driving the vibration reduction optical system, a fixing state determination unit for determining whether the vibration reduction optical system is in the released state, and a vibration reduction start signal generating unit for generating a vibration reduction start signal. When the fixing state determination unit determines that the vibration reduction optical system is in the released state, the determination unit instructs the vibration reduction start signal generating unit to generate the vibration reduction start signal, and the driving unit drives the vibration reduction optical system on the basis of the vibration reduction start signal.

According to the eighth mode of the present invention, when the fixing state determination unit determines that the vibration reduction optical system is in the released state, the determination unit causes the vibration reduction start signal generating unit to generate a vibration reduction start signal. The driving unit drives the vibration reduction optical system on the basis of this vibration reduction start signal. With this operation, vibration reduction can be quickly started by the vibration reduction optical system in the released state.

According to the ninth mode of the present invention, the vibration reduction device of any one of the first to eighth modes includes a driving unit for driving the vibration reduction optical system, a fixing state determination unit for determining whether the vibration reduction optical system is in the fixed state, and a vibration reduction stop signal generating unit for generating a vibration reduction stop signal. When the fixing state determination unit determines that the vibration reduction optical system is not in the released state, the determination unit instructs the vibration reduction stop signal generating unit to generate the vibration reduction stop signal, and the driving unit stops driving the vibration reduction optical system on the basis of the vibration reduction stop signal.

According to the ninth mode of the present invention, when the fixing state determination unit determines that the vibration reduction optical system is not in the released state, the determination unit causes the vibration reduction stop signal generating unit to generate a vibration reduction stop signal. The driving unit stops the vibration reduction optical system on the basis of this vibration reduction stop signal. With this operation, vibration reduction can be quickly stopped by stopping the vibration reduction optical system which is not in the released state.

A vibration reduction device according to the tenth mode of the present invention includes a vibration reduction optical system for reducing vibration, a fixing portion for fixing/releasing the vibration reduction optical system, a holding portion for holding/releasing the fixing portion, a biasing portion interlocked with the releasing operation of the holding portion to bias the fixing portion so as to switch the vibration reduction optical system from a fixed state to a released state, a first restoring portion for restoring the fixing portion with electrical energy so as to switch the vibration reduction optical system from the released state to the fixed state, and a second restoring portion for restoring the fixing portion without electrical energy regardless of the restoring operation of the first restoring portion.

According to the tenth mode of the present invention, since the second restoring portion restores the fixing portion without electrical energy regardless of the restoring operation of the first restoring portion for restoring the fixing portion with electrical energy, the fixing portion can be restored by the second restoring portion without any power supply, and the vibration reduction optical system can be switched from the released state to the fixed state.

According to the eleventh mode of the present invention, in the vibration reduction device of the tenth mode, the biasing portion drives the fixing portion with mechanical energy, and the first restoring portion interlocked with the restoring operation to charge the mechanical energy of the biasing portion, and drives the fixing portion with electrical energy.

According to the eleventh mode of the present invention, since the first restoring portion charges the mechanical energy of the biasing portion, and drives the fixing portion with electrical energy, the mechanical energy required to switch the vibration reduction optical system from the fixed state to the released state can be charged while the vibration reduction optical system is switched from the released state to the fixed state.

According to the twelfth mode of the present invention, in the vibration reduction device of the eleventh mode, the second restoring portion is a manual driving unit for manually driving the fixing portion.

According to the twelfth mode of the present invention, since the second restoring portion is the manual driving unit for manually driving the fixing portion, the fixing portion can be manually restored without any power supply, and the vibration reduction optical system can be switched from the released state to the fixed state.

According to the thirteenth mode of the present invention, in the vibration reduction device of the twelfth mode, the manual driving unit is an operation mode switching unit for switching between at least a mode of performing vibration reduction and a mode of performing no vibration reduction.

According to the thirteenth mode of the present invention, since the manual driving unit is the operation mode switching unit for switching between at least the mode of performing vibration reduction and the mode of performing no vibration reduction, the vibration reduction optical system is interlocked with this operation mode switching operation to allow switching from the released state to the fixed state.

According to the fourteenth mode of the present invention, the vibration reduction device of any one of the tenth to thirteenth modes includes a driving unit for driving the vibration reduction optical system, a fixing state determination unit for determining the fixing state of the vibration reduction optical system, and a vibration reduction start signal generating unit for generating a vibration reduction start signal. When the fixing state determination unit determines that the vibration reduction optical system is in the released state, the determination unit instructs the vibration reduction start signal generating unit to generate the vibration reduction start signal, and the driving unit drives the vibration reduction optical system on the basis of the vibration reduction start signal.

According to the fourteenth mode of the present invention, when the fixing state determination unit determines that the vibration reduction optical system is in the released state, the determination unit causes the vibration reduction start signal generating unit to generate a vibration reduction start signal. The driving unit drives the vibration reduction optical system on the basis of the vibration reduction start signal. Vibration reduction can therefore be quickly started by the vibration reduction optical system in the releasing state.

According to the fifteenth mode of the present invention, the vibration reduction device of any one of the tenth to fourteenth modes includes a driving unit for driving the vibration reduction optical system, a fixing state determination unit for determining the fixing state of the vibration reduction optical system, and a vibration reduction stop signal generating unit for generating a vibration reduction stop signal. When the fixing state determination unit determines that the vibration reduction optical system is not in the released state, the determination unit instructs the vibration reduction stop signal generating unit to generate the vibration reduction stop signal, and the driving unit stops driving the vibration reduction optical system on the basis of the vibration reduction stop signal.

According to the fifteenth mode of the present invention, when the fixing state determination unit determines that the vibration reduction optical system is not in the released state, the determination unit causes the vibration reduction stop signal generating unit to generate a vibration reduction stop signal. The driving unit stops the vibration reduction optical system on the basis of the vibration reduction stop signal. Therefore, vibration reduction can be quickly stopped by stopping driving the vibration reduction optical system which is not in the released state.

DESCRIPTION OF THE PREFERRED EMBODIMENT

An embodiment of the present invention will be described in more detail below with reference to the accompanying drawings.

Figure 1:
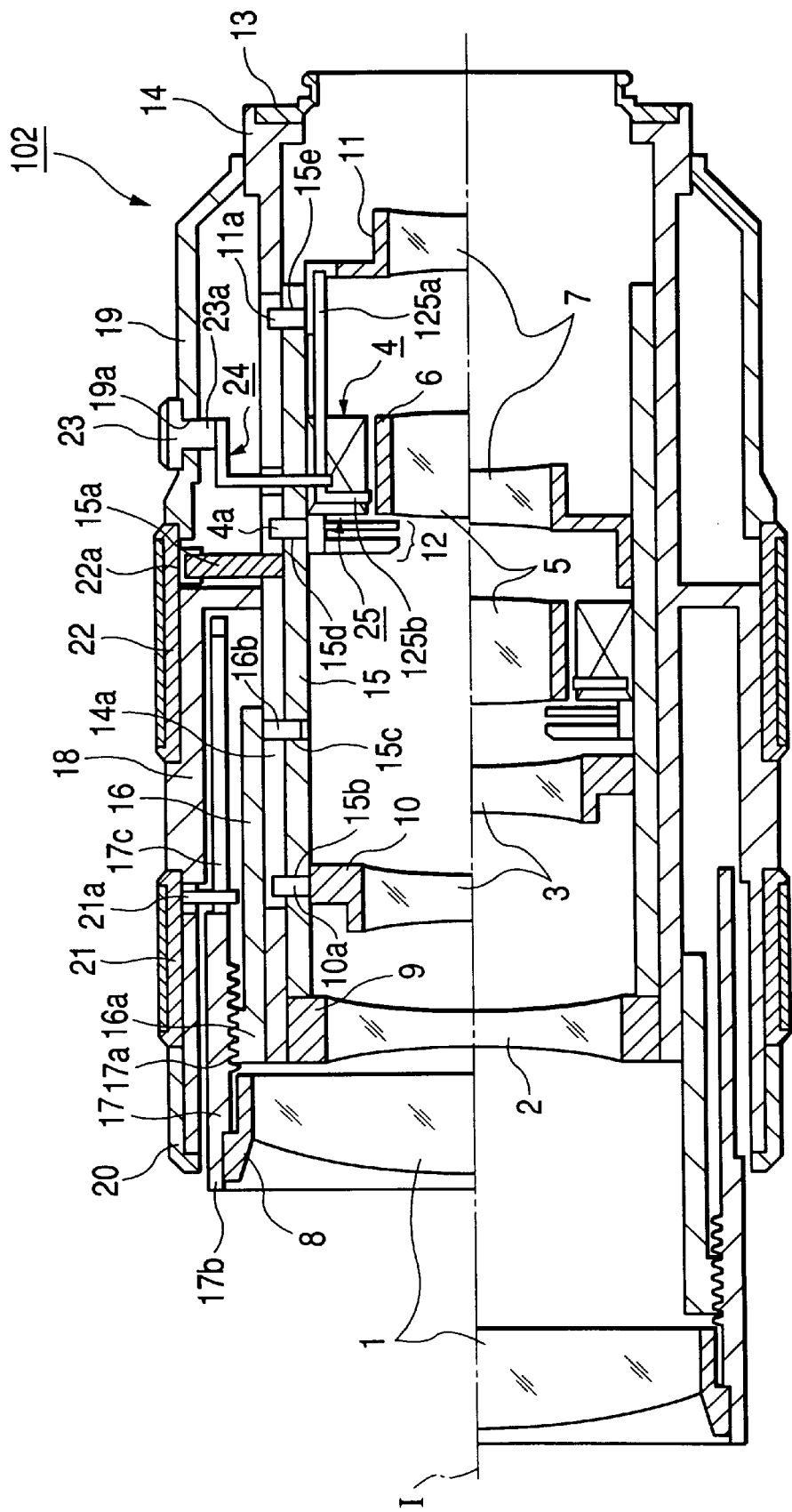
FIG. 1 is a sectional view showing a zoom lens barrel incorporating a vibration reduction device according to an embodiment of the present invention.

FIG. 1 is a sectional view showing a camera lens barrel incorporating a vibration reduction device according to an embodiment of the present invention. The upper and lower halves of FIG. 1 indicate different zoom positions.

As shown in FIG. 1, a lens barrel 102 is a zoom lens having a five-lens-unit structure constituted by a first lens unit (focusing lens) 1 which moves along an optical axis I to perform focus adjustment so as to form an image of an object on an imaging plane, a second lens unit 2, a third lens unit 3, a fourth lens unit (to be referred to as a vibration reduction lens hereinafter) 5 which is driven in a direction perpendicular to the optical axis I to perform vibration reduction, a fifth lens unit 7, and a stop portion 12 for limiting a light beam, the amount of light, and the like. The lens barrel 102 performs zooming (enlargement/reduction) by moving the first lens unit 1, the third lens unit 3, the stop portion 12, the vibration reduction lens 5, a vibration reduction lens driving mechanism 4, and the fifth lens unit 7 along the optical axis I. Note that when the lens barrel 102 performs zooming, the vibration reduction lens 5, the vibration reduction lens driving mechanism 4, and the stop portion 12 integrally moved along the optical axis I without changing their relative positions.

The lens barrel 102 is constituted by an inner fixing barrel 14, an external fixing barrel 18 mounted on the inner fixing barrel 14, a cover 19 mounted on the inner fixing barrel 14, a cover 20 mounted on the external fixing barrel 18, a cam barrel 15, a first lens unit moving frame 8 for holding the first lens unit 1, a helicoid barrel 17, a distance ring 21, a zoom ring 22, the vibration reduction lens driving mechanism 4, a vibration reduction mode switch 23, and the like.

The inner fixing barrel 14 is a member for supporting a first lens unit moving barrel 16 while allowing it to be movable along the optical axis I. The inner fixing barrel 14 has a straight slot 14a and a mount portion 13. The straight slot 14a is parallel to the optical axis. Pins 10a, 16b, 4a, and 11a (to be described later) are movably fitted in the straight slot 14a. The mount portion 13 is formed on the opposite side to the object side and can be mounted on the camera body (not shown). A second lens unit holding frame 9 for holding the second lens unit 2 is mounted on the object-side end portion (distal end portion) of the inner circumferential portion of the inner fixing barrel 14. In addition, the outer circumferential portion of the cam barrel 15 (to be described later) is held on the inner circumferential portion of the inner fixing barrel 14 to be rotatable about the optical axis I. The inner circumferential portion of the first lens unit moving barrel 16 (to be described later) is supported on the outer circumferential portion of the inner fixing barrel 14 to be movable along the optical axis I.

The external fixing barrel 18 is a member for rotatably supporting the distance ring 21 and the zoom ring 22 (both of which will be described later). The inner circumferential portions of the distance ring 21 and the zoom ring 22 are rotatably supported on the outer circumferential portion of the external fixing barrel 18. The cover 19 for rotatably supporting the zoom ring 22 and the cover 20 for rotatably fixing the distance ring 21 are mounted on the outer circumferential portion of the external fixing barrel 18.

The distance ring 21 is a member to be operated to perform focus adjustment so as to form an image of an object on an imaging plane (not shown). A pin portion 21a is formed on the distance ring 21. The pin portion 21a protrudes from the inner circumferential portion of the distance ring 21, extends through a circumferential slot formed in the external fixing barrel 18 in the circumferential direction, and engages with an engaging portion 17c protruding from the helicoid barrel 17 along the optical axis I. The movement of the distance ring 21 along the optical axis I is restricted by the cover 20.

The zoom ring 22 is a member to be operated to continuously change the focal length. The end portion, of the zoom ring 22, located on the mount portion 13 side is rotatably supported on the cover 19. An engaging portion 22a with which the distal end of a pin 15a is engaged is formed on the inner circumferential portion of the zoom ring 22 at a position between the external fixing barrel 18 and the cover 19.

The cam barrel 15 is a member to be rotated to move the first lens unit moving barrel 16, a third lens unit moving frame 10 for holding the third lens unit 3, the vibration reduction lens 5, a vibration reduction lens frame 6, the vibration reduction lens driving mechanism 4, the stop portion 12, and a fifth lens unit moving frame 11 for holding the fifth lens unit 7 along the optical axis I. The cam barrel 15 has cam slots 15c, 15b, 15d, and 15e in which the pin 16b protruding from the inner circumferential portion of the first lens unit moving barrel 16, the pin 10a protruding from the outer circumferential portion of the third lens unit moving frame 10, the pin 4a protruding from the outer circumferential portions of the vibration reduction lens frame 6, the vibration reduction lens driving mechanism 4, the stop portion 12, and the pin 11a protruding from the outer circumferential portion of the fifth lens unit moving frame 11 are fitted. The outer circumferential portions of the third lens unit moving frame 10, the vibration reduction lens driving mechanism 4, the stop portion 12, and the fifth lens unit moving frame 11 are supported on the inner circumferential portion of the cam barrel 15 to be movable along the optical axis I. The pin 15a protrudes from the outer circumferential portion of the cam barrel 15 to extend through a circumferential slot formed between the external fixing barrel 18 and the cover 19 in the circumferential direction so as to be fitted in the engaging portion 22a of the zoom ring 22.

The helicoid barrel 17 is a member for moving, along the optical axis I, the first lens unit moving frame 8 holding the first lens unit 1. The first lens unit moving frame 8 is mounted on the distal end portion of the inner circumferential portion of the helicoid barrel 17. A female helicoid threaded portion 17a to be meshed with a male helicoid threaded portion 16a formed on the outer circumferential portion of the first lens unit moving barrel 16 is formed on the inner circumferential portion of the helicoid barrel 17.

The vibration reduction lens driving mechanism 4 is a mechanism for performing vibration reduction by driving the vibration reduction lens 5 as part of the photographing optical system in a direction perpendicular to the optical axis I.

Figure 2:
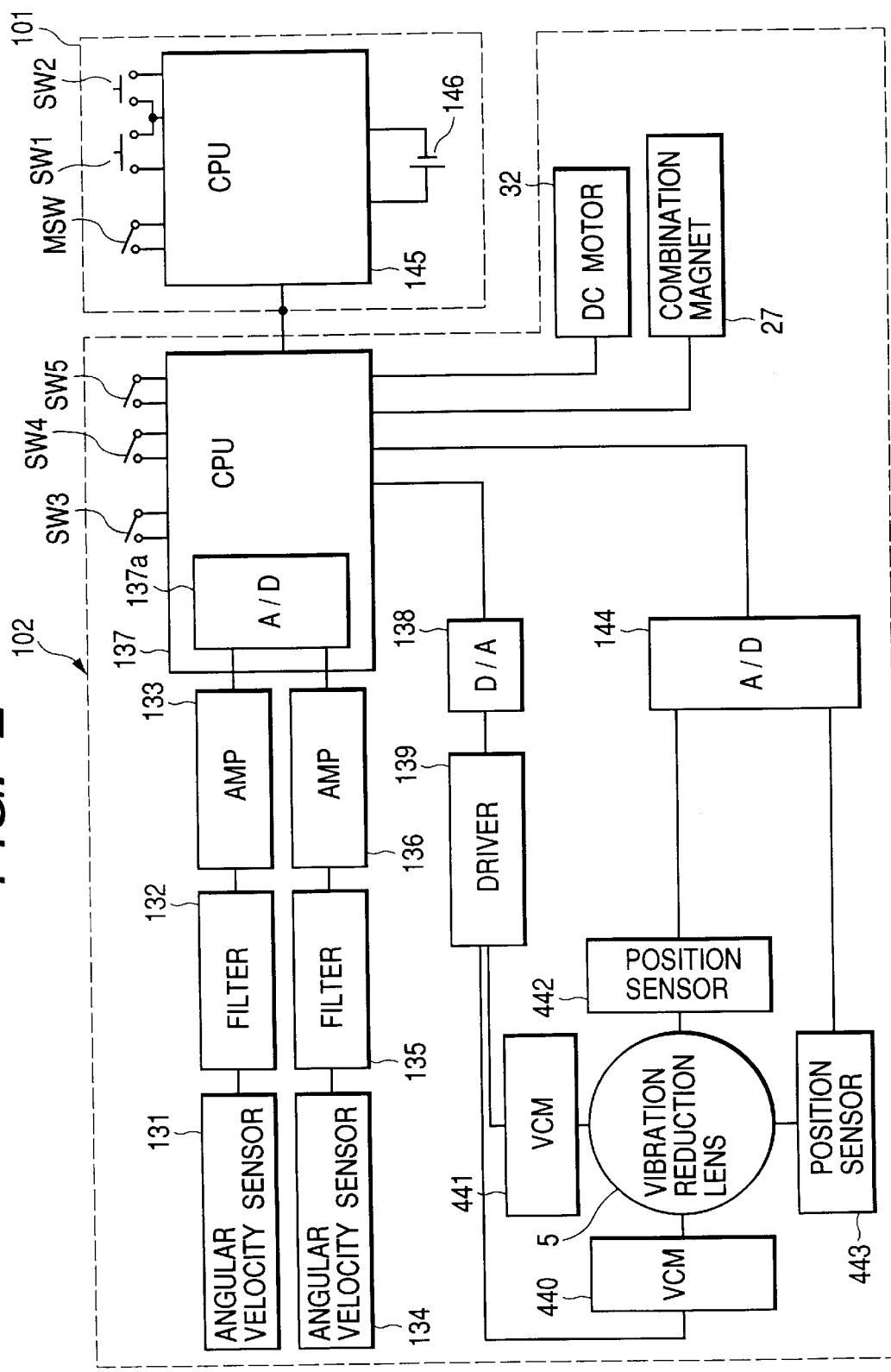
FIG. 2 is a block diagram showing the vibration reduction device according to the embodiment of the present invention.

FIG. 2 is a block diagram showing the vibration reduction device according to the embodiment of the present invention.

Angular velocity sensors 131 and 134 detect the vibration of a camera body 101 and the lens barrel 102 in the horizontal and vertical directions. The resultant vibration detection signals are supplied to amplifiers 133 and 136 through filters 132 and 135 to be amplified. The amplified signals are input to a CPU 137. The CPU 137 A/D-converts the input vibration detection signals through a built-in A/D converter 137a, and performs a predetermined process for the signals, thereby calculating vibration reduction amounts. The CPU 137 generates vibration reduction control signals in accordance with the vibration reduction amounts. The outputs from the CPU 137 are D/A-converted by a D/A converter 138. The resultant signals are then input to voice coil motors (VCMS) 440 and 441 through a driver 139.

The voice coil motors (VCMs) 440 and 441 are motors for driving the vibration reduction lens 5. The structure of each motor will be described later with reference to FIGS. 3 to 6. Detection signals from position sensors 442 and 443 are A/D-converted by an A/D converter 144 to be fed back to the CPU 137. The following components are connected to the CPU 137: a switch SW3 interlocking with the vibration reduction mode switch 23 (to be described later); a detection switch SW4 for detecting the fixing state of the vibration reduction lens frame 6; a detection switch SW5 for detecting the releasing state of the vibration reduction lens frame 6; a DC motor 32 for rotating a locking ring 25 and an engaging lever 41 (both of which will be described later); and a magnet 27 for attracting an iron piece 27a mounted on an iron piece lever 42 (to be described later).

The camera body 101 has a CPU 145 for performing various control operations for the overall camera systems. The following components are connected to the CPU 145: a power supply battery 146; a main switch (power switch) MSW; a first-stroke switch SW1 which is turned on when the release button is depressed to the first-stroke position;

and a second-stroke switch SW2 which is turned on when the release button is depressed to the second-stroke position. The CPU 145 communicates with the CPU 137 to transfer information.

Figure 3:
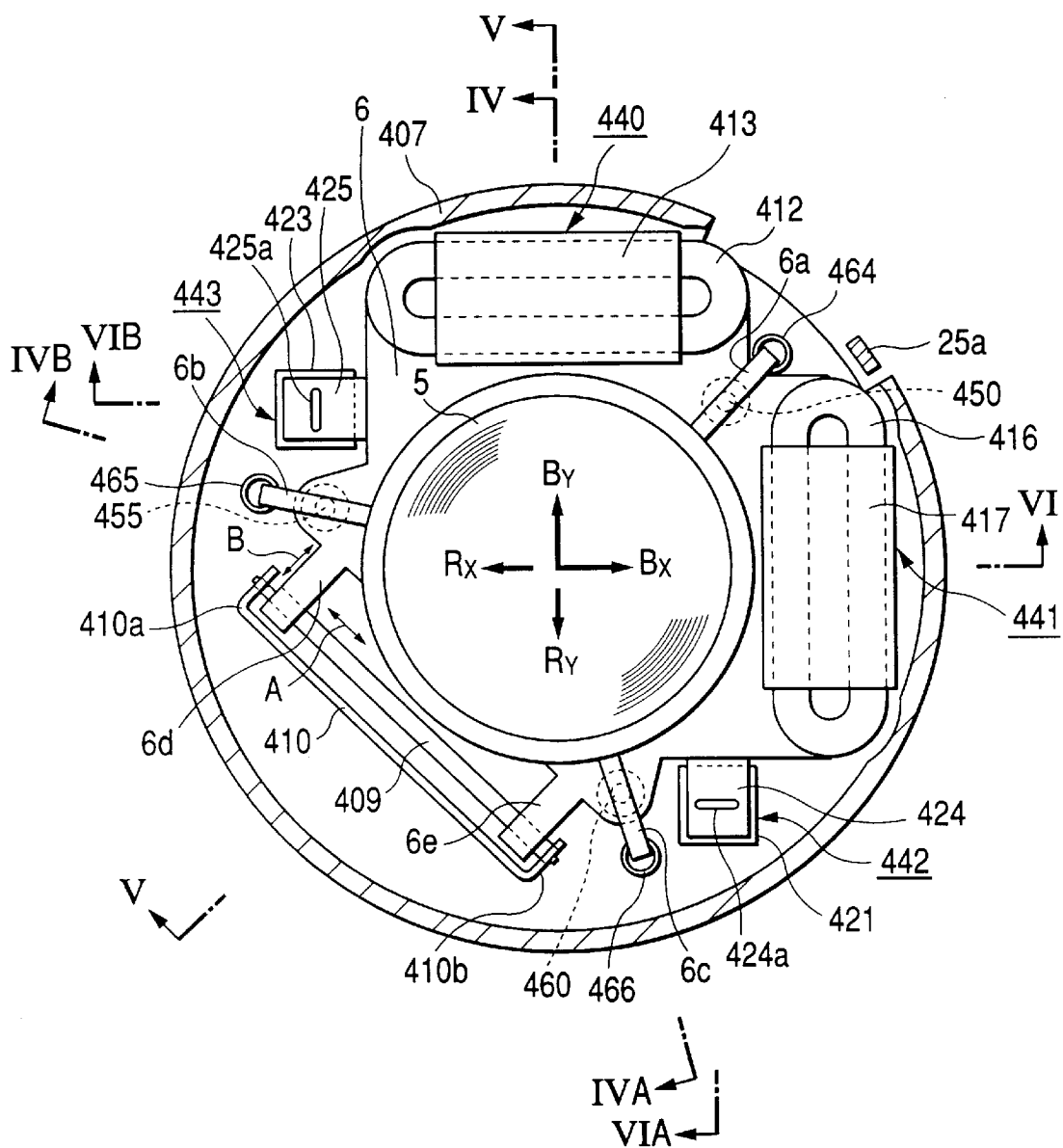
FIG. 3 is a sectional view showing the vibration reduction device according to the embodiment of the present invention.
Figure 4:
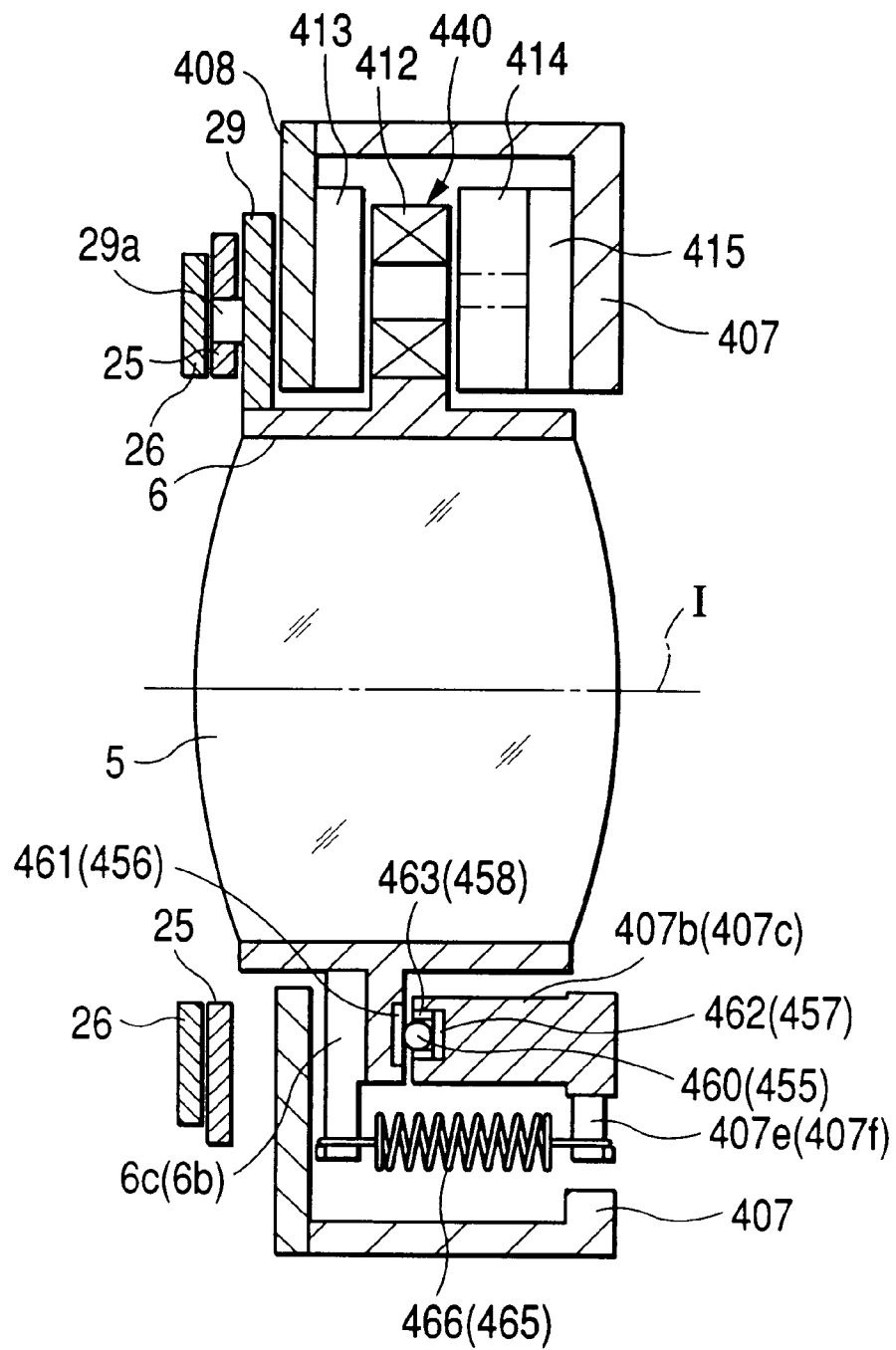
FIG. 4 is a sectional view taken along a line IV-IVA in FIG. 3.
Figure 5:
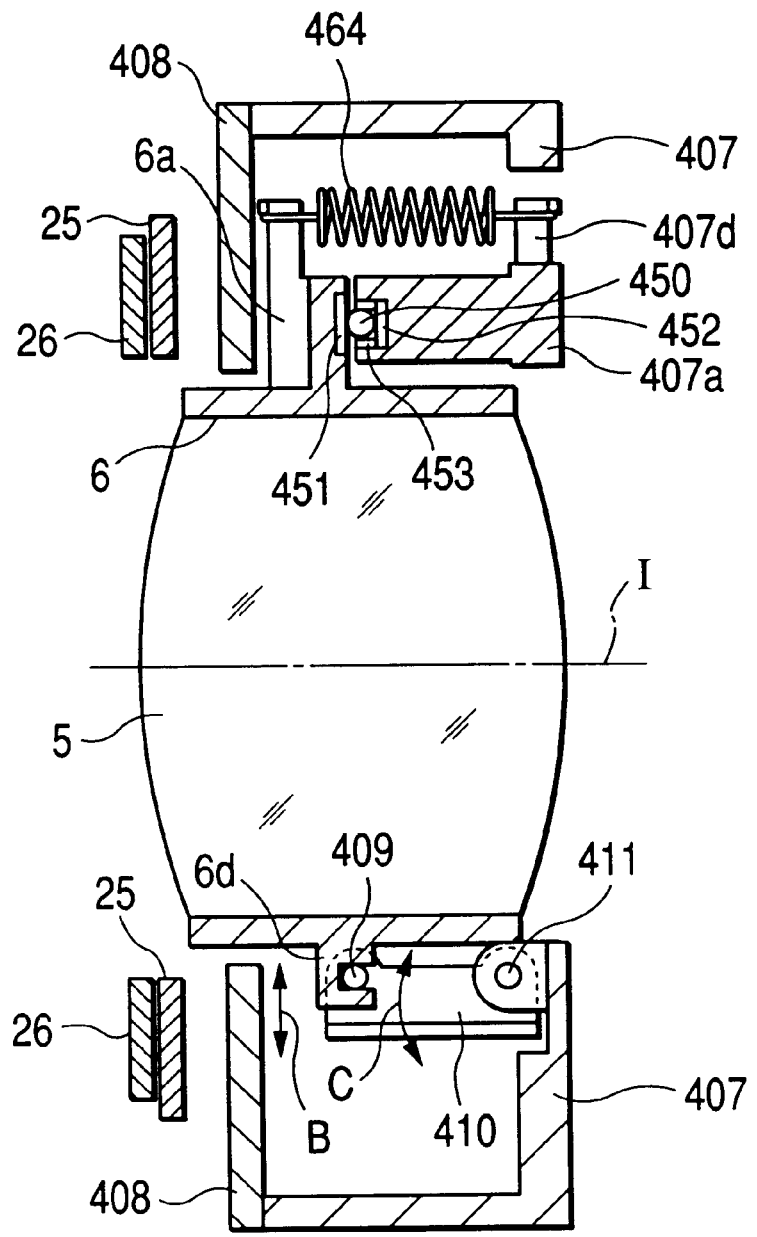
FIG. 5 is a sectional view taken along a line V—V in FIG. 3.
Figure 6:
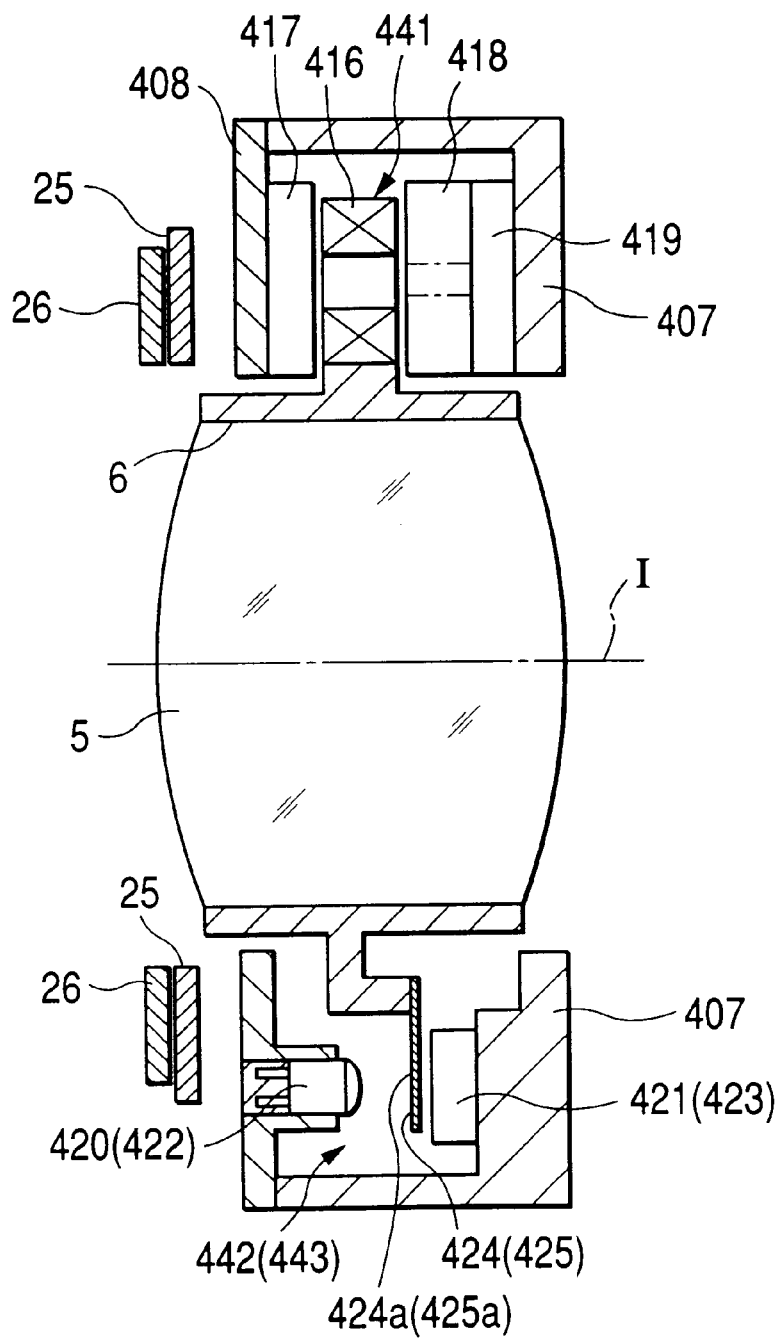
FIG. 6 is a sectional view taken along a line VI-VIA in FIG. 3.

FIG. 3 is a sectional view showing the vibration reduction device according to the embodiment of the present invention. FIG. 4 is a sectional view taken along a line IV-IVA in FIG. 3. FIG. 5 is a sectional view taken along a line V—V in FIG. 3. FIG. 6 is a sectional view taken along a line VI-VIA in FIG. 3. Note that the reference numerals of members in a sectional view taken along a line IV-IVB in FIG. 3 are enclosed by parentheses in FIG. 4, and the reference numerals of members in a sectional view taken along a line VI-VIB in FIG. 3 are also enclosed by parentheses in FIG. 6.

The vibration reduction lens frame 6 is a frame for holding the vibration reduction lens 5. As shown in FIG. 3, spring hooks 6a, 6b, and 6c, on each of which one end of a corresponding one of springs 464, 465, and 466 is hooked, and hook portions 6d and 6e are formed on the outer circumferential portion of the vibration reduction lens frame 6. In addition, slit members 424 and 425 of the position sensors 442 and 443 are mounted on the outer circumferential portion of the vibration reduction lens frame 6 as shown in FIG. 3; so are coils 412 and 416 of the voice coil motors (VCMs) 440 and 441 as shown in FIG. 4; and so are steel ball bearing members 451, 456, and 461 as shown in FIGS. 4 and 5.

The steel ball bearing members 451, 456, and 461 are members for guiding the movement of the vibration reduction lens frame 6 when the frame 6 is driven in a direction perpendicular to the optical axis I. The steel ball bearing members 451, 456, and 461 are in contact with steel balls 450, 455, and 460, respectively, to allow the vibration reduction lens frame 6 to smoothly move. The steel ball bearing members 451, 456, and 461 are made of a metal having a hardness higher than that of the steel balls 450, 455, and 460.

A base frame 407 is a member for housing and protecting the vibration reduction lens driving mechanism 4 constituted by the voice coil motors 440 and 441 for driving the vibration reduction lens frame 6 and the vibration reduction lens 5, a guide shaft 409, and the springs 464, 465, and 466. Steel ball incorporating portions 407a, 407b, and 407c, spring hooks 407d, 407e, and 407f, on each of which the other end of a corresponding one of the springs 464, 465, and 466 is hooked, and a shaft 410 are mounted on the base frame 407 as shown in FIGS. 4 and 5, and so are yokes 415 and 419 of the voice coil motors 440 and 441 and light-receiving elements (PSDs) 421 and 423 of the position sensors 442 and 443 as shown in FIGS. 4 and 6.

A frame member 408 is a member for protecting the vibration reduction lens frame 6 and the vibration reduction lens driving mechanism 4 housed in the base frame 407. As shown in FIGS. 4 and 6, yokes 413 and 417 of the voice coil motors 440 and 441 and light-emitting elements (LEDs) 420 and 422 of the position sensors 442 and 443 are mounted on the inner surface of the frame member 408.

The guide shaft 409 is a member for guiding the vibration reduction lens frame 6 when the frame 6 moves in a direction perpendicular to the optical axis I. The guide shaft 409 is placed in the A direction in FIG. 3 to cross both the BX and BY directions in FIG. 3 at angles other than a right angle. The hook portions 6d and 6e are slidably engaged with the guide shaft 409.

The guide arm 410 is a member for moving the vibration reduction lens frame 6 parallel to the guide direction (A direction in FIG. 3) of the guide shaft 409. Bent portions 410a and 410b are formed on the two end portions of the guide arm 410. The guide shaft 409 is rotatably supported on the bent portions 410a and 410b. As shown in FIG. 5, the end portion, of the guide arm 410, located on the base frame 407 side is rotatably (in the C direction in FIG. 5) supported on a shaft 411. When the guide arm 410 rotates, the vibration reduction lens frame 6 moves in a direction (B direction in FIG. 5) crossing the guide direction (A direction in FIG. 5) of the guide shaft 409.

As shown in FIG. 3, the voice coil motors 440 and 441 are motors for driving the vibration reduction lens frame 6 by applying forces to the vibration reduction lens frame 6 in the BX and BY directions. The voice coil motors 440 and 441 have the same structure, but apply forces to the vibration reduction lens frame 6 in different directions. As shown in FIG. 4, the voice coil motor 440 is constituted by the yoke 413, a permanent magnet 414 for forming a magnetic field between itself and the yoke 413, the coil 412 placed between the yoke 413 and the permanent magnet 414, and the yoke 415 for fixing the permanent magnet 414. When a current flows in the coil 412, the vibration reduction lens 5 is driven upon reception of a thrust PY in a downward direction along the BY direction. When a current flows in the coil 412 in the reverse direction, the vibration reduction lens 5 is driven upon reception of a thrust in the reverse (upward) direction.

The position sensors 442 and 443 are used to respectively detect the positions of the vibration reduction lens 5 in the BY and BX directions. The position sensors 442 and 443 have the same structure. The position sensor 442 will be described with reference to FIG. 6. The position sensor 442 is constituted by the light-emitting element 420 mounted on the frame member 408, the light-receiving element 421 mounted on the base frame 407, the slit member 424 placed between the light-emitting element 420 and the light-receiving element 421, and a slit 424a formed in the slit member 424. Light emitted from the light-emitting element 420 reaches the light-receiving element 421. When the slit 424a moves, the position of light passing through the slit 424a and reaching the light-receiving element 421 also moves. An output signal from the light-receiving element 421 changes upon movement of the position of incident light. The position of the vibration reduction lens 5 in the BY direction is detected on the basis of a change in this output signal.

The steel ball incorporating portions 407a, 407b, and 407c are members for holding the steel balls 450, 455, and 460. As shown in FIGS. 4 and 5, the steel ball incorporating portions 407a, 407b, and 407c have the same structure. Only the steel ball incorporating portion 407a will be described below with reference to FIG. 5. The steel ball incorporating portion 407a is constituted by the steel ball 450, a retainer member 453 for housing the steel ball 450 while causing it to be slightly exposed from the steel ball incorporating portion 407a, a steel ball bearing member 452 (to be described later) formed on the bottom portion of the retainer member 453.

The steel ball bearing member 452 is a guide member which is kept in contact with the steel ball 450 to receive it. The steel ball bearing member 452 is made of a metal having a hardness higher than that of the steel ball 450. The steel ball bearing member 452 preferably has a flat surface to be in point contact with the steel ball 450.

Figure 7:
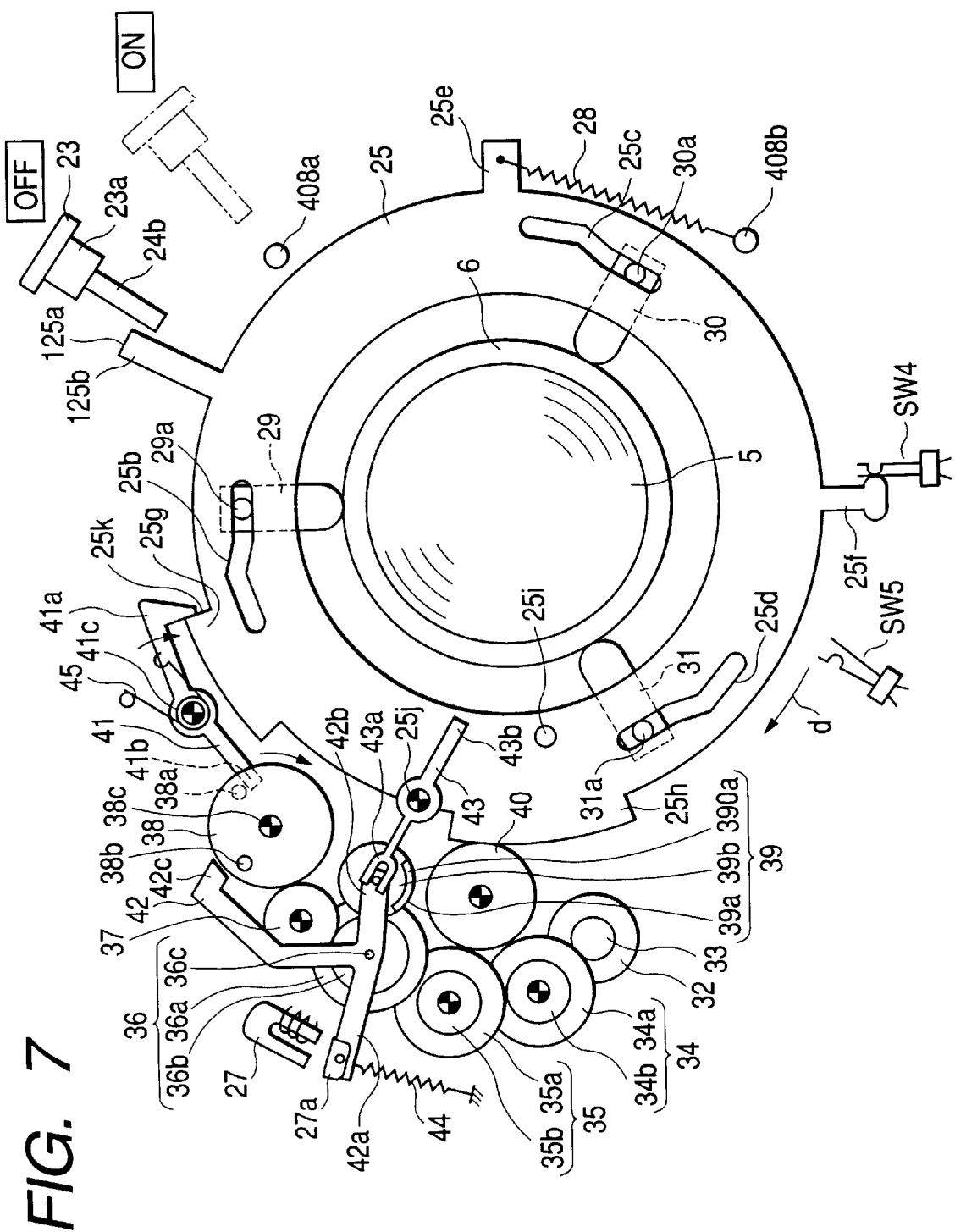
FIG. 7 is a sectional view showing the fixing state of a locking mechanism in the vibration reduction device according to the embodiment of the present invention.
Figure 8:
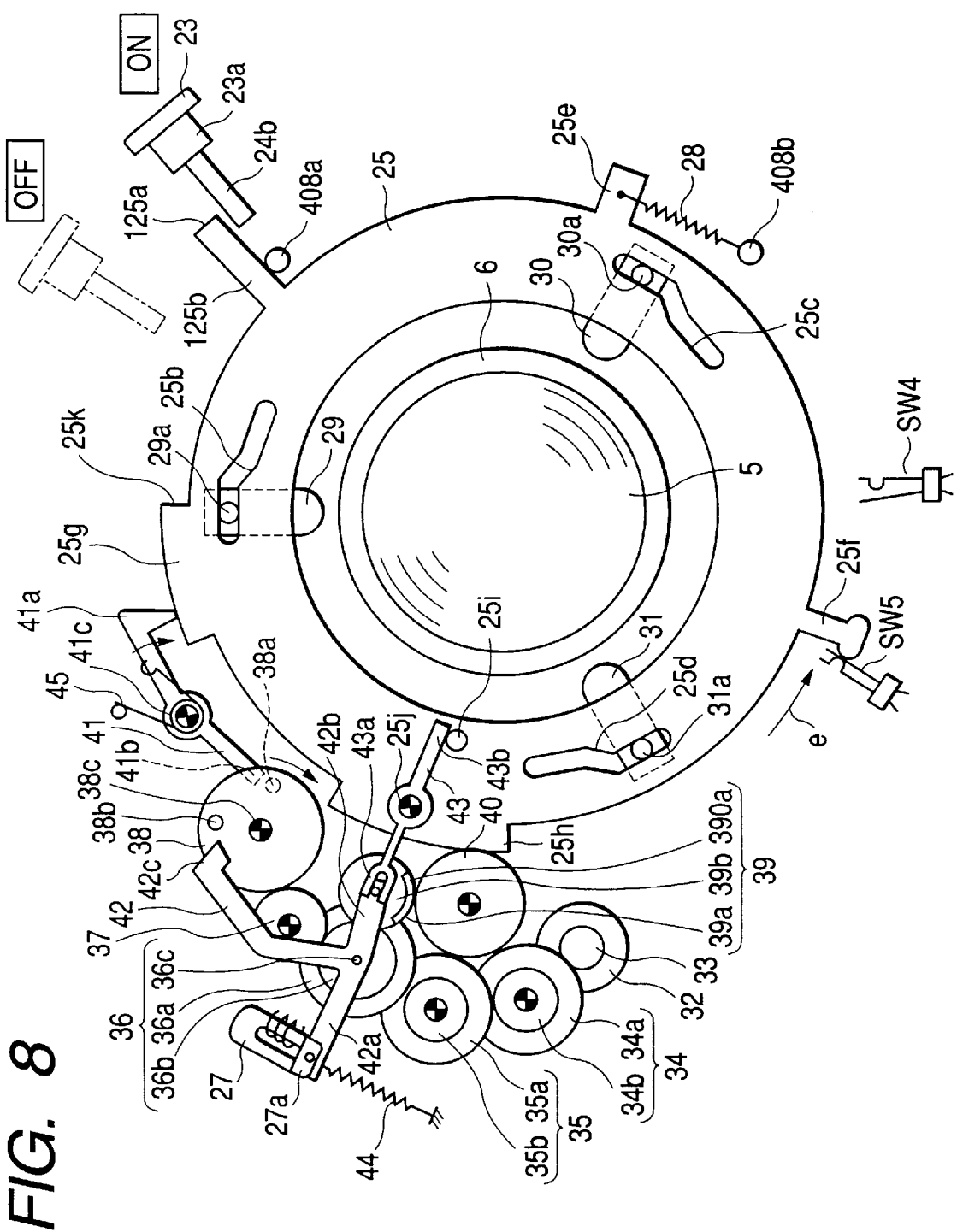
FIG. 8 is a sectional view showing the releasing state of the locking mechanism in the vibration reduction device according to the embodiment of the present invention.
Figure 9:
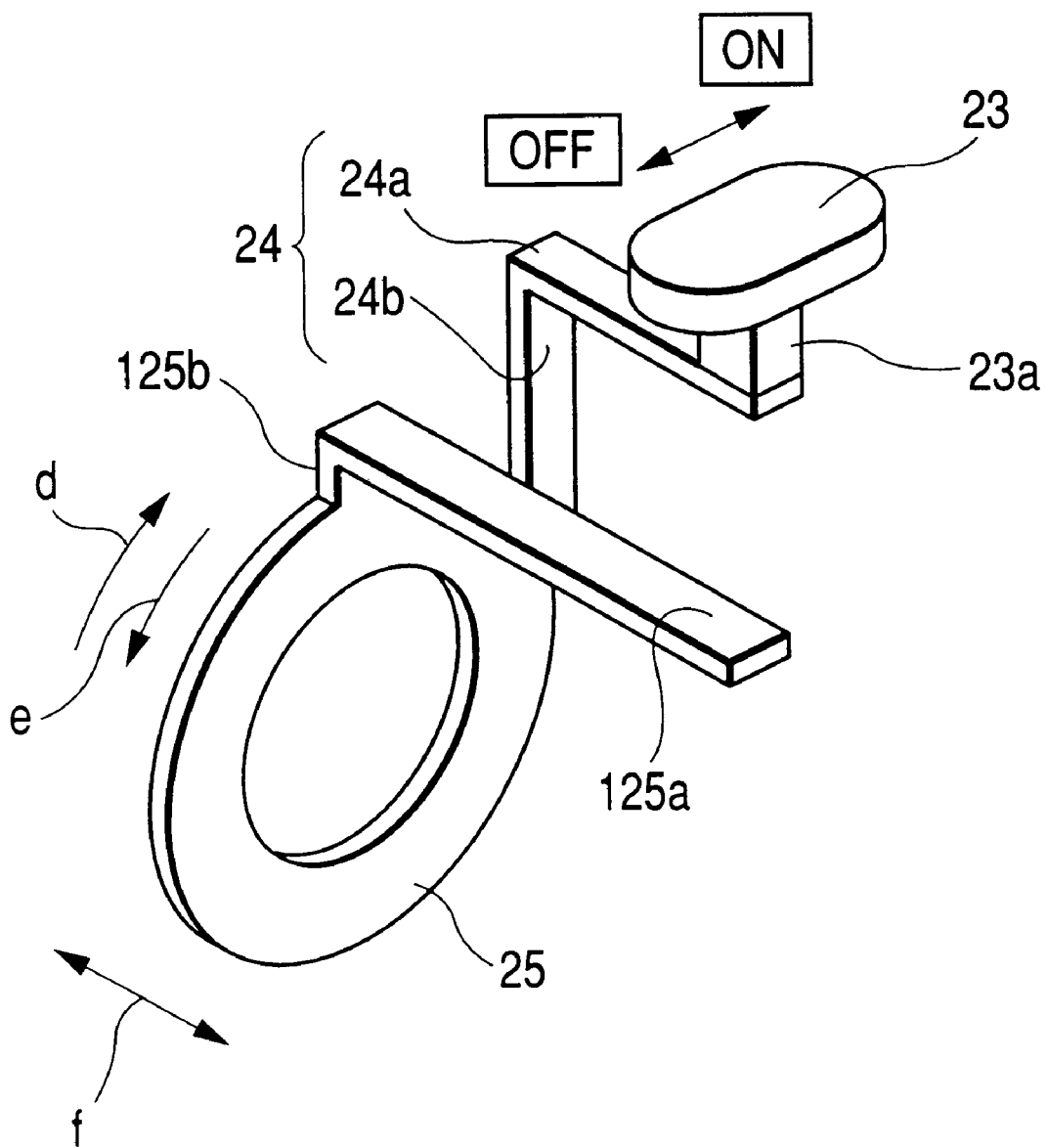
FIG. 9 is a perspective view schematically showing a vibration reduction mode switch and a locking ring in the vibration reduction device according to the embodiment of the present invention.

FIG. 7 is a sectional view showing the fixing state of the locking mechanism in the vibration reduction device according to the embodiment of the present invention. FIG. 8 is a sectional view showing the releasing state of the locking mechanism in the vibration reduction device according to the embodiment of the present invention. FIG. 9 is a perspective view schematically showing the vibration reduction mode switch and the locking ring in the vibration reduction device according to the embodiment of the present invention.

The vibration reduction mode switch 23 is a switch for switching the operation of the vibration reduction lens 5 between a plurality of operation modes. The vibration reduction mode switch 23 is also a member used to manually operate the locking ring 25 (to be described later) so as to switch the releasing state (shown in FIG. 8) of the vibration reduction lens frame 6 to the fixing state (shown in FIG. 7). In the embodiment of the present invention, the vibration reduction mode switch 23 is switched between the ON position at which vibration reduction is performed by the vibration reduction lens 5 and the OFF position at which no vibration reduction is performed. As shown in FIGS. 1 and 7, the vibration reduction mode switch 23 is mounted on the cover 19 to be slidable in the circumferential direction. A support portion 23a is formed on the vibration reduction mode switch 23 to extend through a through hole 19a formed in the cover 19 and move between the ON position and the OFF position. As shown in FIG. 8, when the vibration reduction mode switch 23 is manually moved from the ON position to the OFF position, the vibration reduction lens frame 6 is fixed with locking members 29, 30, and 31 regardless of whether the DC motor 32 (to be described later) rotates the locking ring 25 in the e direction to return it to the home position. As shown in FIG. 7, when the vibration reduction lens frame 6 is in the fixing state, the vibration reduction mode switch 23 can freely move between the ON position and the OFF position regardless of the locking ring 25.

An abutment member 24 is a member which interlocked with the switching operation of the vibration reduction mode switch 23 to come into contact with an interlocking member 125a, and fixes the locking ring 25 together with the interlocking member 125a. As shown in FIG. 9, the abutment member 24 is mounted on the support portion 23a of the vibration reduction mode switch 23. The abutment member 24 is an L-shaped member constituted by a parallel member 24a extending parallel to the optical axis I and an abutment portion 24b which is bent from the parallel member 24a at a right angle and in contact with the interlocking member 125a.

As shown in FIGS. 7 to 9, the locking ring 25 is a member which is rotated in the e and d directions to fix and release the vibration reduction lens frame 6 with the locking members 29, 30, and 31 (to be described later). The locking ring 25 has S-shaped cam slots 25b, 25c, and 25d in which pins 29a, 30a, and 31a formed on the locking members 29, 30, and 31 are fitted, a pin 25i which comes into contact with and separates from an arm portion 43b of a seesaw lever 43, and a support shaft 25j for rotatably supporting the seesaw lever 43. The following components are formed on the outer circumferential portion of the locking ring 25: a support portion 125b of the interlocking member 125a (to be described later); a spring hook 25e on which one end of a spring 28 (to be described later) is hooked; a projection 25f for turning on/off the detection switches SW4 and SW5 (to be described later); a projected portion 25g having a shoulder 25k on which a pawl portion 41a of the engaging lever 41 (to be described later) is locked and allowing the locking ring 25 to rotate through a predetermined angle while the pawl portion 41a rides on the circumferential portion of the projected portion 25g; and a gear portion 25h to be meshed with a gear 40 (to be described later).

The locking members 29, 30, and 31 are members which come into contact with and separate from the outer circumferential portion of the vibration reduction lens frame 6 to fix and release the vibration reduction lens frame 6. As shown in FIGS. 7 and 8, the locking members 29, 30, and 31 are arranged around the optical axis I as a center at angular intervals of 120°. When the locking members 29, 30, and 31 move back and forth in the radial direction of the vibration reduction lens frame 6, the distal end portions of the locking members 29, 30, and 31 come into contact and separate from the outer circumferential portion of the vibration reduction lens frame 6, thereby fixing and releasing the vibration reduction lens frame 6. The locking members 29, 30, and 31 respectively have the pins 29a, 30a, and 31a protruding in a direction perpendicular to their longitudinal direction.

The interlocking member 125a is a member interlocked with the switching operation of the vibration reduction mode switch 23 to rotate the locking ring 25 regardless of the moving positions of the vibration reduction lens frame 6 and the vibration reduction lens driving mechanism 4 along the optical axis I. As shown in FIGS. 1 and 9, the interlocking member 125a extends parallel to the optical axis I. One end of the interlocking member 125a is bent vertically to form the support portion 125b. The support portion 125b comes into contact with a stopper portion 408a formed on the frame member 408 to restrict the rotation amount of the locking ring 25. The interlocking member 125a has a length that allows it to contact the abutment portion 24b at any moving positions of the vibration reduction lens frame 6 and the vibration reduction lens driving mechanism 4 when they move in the f direction in a zooming operation.

As shown in FIG. 7, the spring 28 is a member for biasing the locking ring 25 to rotate it the clockwise direction (the d direction in FIG. 7). One end of the spring 28 is hooked on the spring hook 25e of the locking ring 25, and the other end, of the spring 28, located on the opposite side to the side where the spring 28 is hooked on the spring hook 25e is hooked on a spring hook 408b formed on the frame member 408. When the pawl portion 41a of the engaging lever 41 is disengaged from the shoulder 25k of the projected portion 25g of the locking ring 25, the spring 28 interlocks with this movement to rotate the locking ring 25 in the d direction in FIG. 7 with the charged elastic energy (mechanical energy), thereby switching the vibration reduction lens frame 6 from the fixing state to the releasing state.

The DC motor 32 is a member for rotating the locking ring 25 and returning it to the home position so as to switch the vibration reduction lens frame 6 from the releasing state to the fixing state by rotating the locking ring 25 in the e direction in FIG. 7. The DC motor 32 also rotates the engaging lever 41 so as to disengage the pawl portion 41a of the engaging lever 41 from the shoulder 25k of the projected portion 25g of the locking ring 25. A gear 33 is mounted on the output shaft of the DC motor 32. The DC motor 32 rotates a disengaging gear 38 meshed with a gear 37 through a wheel 34a of a gear unit 34 which is meshed with the gear 33, a wheel 35a of a gear unit 35 which is meshed with a pinion 34b of the gear unit 34, a wheel 36a of a gear unit 36 which is meshed with a pinion 35b of the gear unit 35, and the gear 37 meshed with a pinion 36b of the gear unit 36. The DC motor 32 also rotates the gear 40 meshed with an upper gear 39a of a gear unit 39 through a lower gear 39b of the gear unit 39 which is meshed with the pinion 36b of the gear unit 36. The gear 40 is meshed with the locking ring 25. Upon rotation of the gear 40, therefore, the locking ring 25 also rotates. The DC motor 32 rotates the locking ring 25 in the e direction in FIG. 7 against the biasing force of the spring 28 to charge the elastic energy of the spring 28. As shown in FIG. 2, the DC motor 32 is connected to the CPU 137 and rotates upon reception of power (electrical energy) supplied from the power supply battery 146 connected to the CPU 145.

The engaging lever 41 is a member for holding/canceling the fixing state of the vibration reduction lens frame 6 with the locking ring 25 by engaging/disengaging the pawl portion 41a with/from the shoulder 25k of the projected portion 25g of the locking ring 25. The engaging lever 41 has the pawl portion 41a and an arm portion 41b which comes into contact and separate from a disengaging pin 38a of the disengaging gear 38. The engaging lever 41 is rotatably mounted on a support shaft 41c and biased in the clockwise direction (indicated by the arrow in FIG. 7) by a spring 45.

The disengaging gear 38 rotates in the clockwise direction (indicated by the arrow in FIG. 7) to rotate the engaging lever 41 in the counterclockwise direction, thereby disengaging the pawl portion 41a of the engaging lever 41 from the shoulder 25k of the projected portion 25g of the locking ring 25. The disengaging pin 38a and a pin 38b which is engaged with and disengaged from an engaging arm portion 42c of the iron piece lever 42 (to be described later) are respectively formed on the rear and front sides of the disengaging gear 38. The disengaging gear 38 is rotatably supported on a support shaft 38c.

The iron piece lever 42 is a portion of a clutch member which rotates about a bearing portion 36c of the gear unit 36 to maintain/cancel the engagement between the gear unit 39 and the gear 40, and also servers as a member for restricting the rotation of the disengaging gear 38. The iron piece lever 42 is supported by the bearing portion 36c of the gear unit 36 to be rotatable independently of the gear unit 36. As shown in FIGS. 7 and 8, the iron piece lever 42 has an arm portion 42a having the iron piece 27a mounted on its distal end portion, an arm portion 42b on which a fork portion 43a of the seesaw lever 43 is movably fitted and which rotatably supports the gear unit 39, and the engaging arm portion 42c branching from the arm portions 42a and 42b at the bearing portion 36c and having a distal end portion which is engaged/disengaged with/from the pin 38b of the disengaging gear 38. The iron piece lever 42 is biased to rotate in the counterclockwise direction by a spring 44 mounted on the arm portion 42a. As shown in FIG. 7, when the iron piece 27a of the iron piece lever 42 is not attracted to (not brought into contact with) the magnet 27, the engaging arm portion 42c is separated from the pin 38b. As shown in FIG. 8, when the iron piece 27a of the iron piece lever 42 is attracted to the magnet 27, the engaging arm portion 42c moves inward from the outer circumferential portion of the disengaging gear 38 and hence can come into contact with the pin 38b.

The gear unit 39 is a portion of a clutch mechanism for transferring the rotating force from the DC motor 32 to the locking ring 25 or canceling it by maintaining/canceling a meshed state with the gear 40. The gear unit 39 is a planetary gear which is rotatably supported on the arm portion 42b of the iron piece lever 42 and rotates about the pinion 36b while meshing with the pinion 36b of the gear unit 36. A notched portion 390a is formed in the outer circumferential portion of the gear unit 39. The portion of the gear unit 39 other than the notched portion 390a is constituted by the upper gear 39a meshed with the gear 40 and the lower gear 39b meshed with the gear 40. As shown in FIG. 7, when the iron piece 27a of the iron piece lever 42 is not attracted to the magnet 27, the gear unit 39 is separated from the gear 40 and released from the gear 40. In contrast to this, as shown in FIG. 8, when the iron piece 27a of the iron piece lever 42 is attracted to (brought into contact with) the magnet 27, the gear unit 39 meshes with the gear 40.

The seesaw lever 43 is a portion of a clutch member which comes into contact with the pin 25i of the locking ring 25 to mesh the gear unit 39 with the gear 40, and also serves as a member for rotating the iron piece lever 42 clockwise. The seesaw lever 43 has the fork portion 43a, which is fitted on the arm portion 42b of the iron piece lever 42, and the arm portion 43b. As shown in FIG. 7, when the arm portion 43b is not in contact with the pin 25i of the locking ring 25, the seesaw lever 43 rotates the iron piece lever 42 counterclockwise to separate the gear unit 39 from the gear 40. In contrast to this, as shown in FIG. 8, when the arm portion 43b is in contact with the pin 25i of the locking ring 25, the seesaw lever 43 rotates the iron piece lever 42 clockwise to allow the gear unit 39 to mesh with the gear 40.

The detection switch SW4 is a switch which is turned on when coming into contact with the projection 25f of the locking ring 25 to detect that the vibration reduction lens frame 6 is in the fixing state.

The detection switch SW5 is a switch which is turned on when coming into contact with the projection 25f of the locking ring 25 to detect that the vibration reduction lens frame 6 is in the releasing state.

The zooming operation and focusing operation of the lens barrel incorporating the vibration reduction device according to the embodiment of the present invention will be described next separately.

(Zooming Operation)

In the state shown in FIG. 1, when the zoom ring 22 rotates about the optical axis I, the cam barrel 15 having the pin 15a engaged with the engaging portion 22a of the zoom ring 22 rotates together with the zoom ring 22. When the cam barrel 15 rotates about the optical axis I, the cam slots 15b, 15c, 15d, and 15e formed in the cam barrel 15 respectively push the pins 10a, 16b, 4a, and 11a, which are movably fitted in the respective cam slots. The end portions of the pins 10a, 16b, 4a, and 11a are movably fitted in the straight slot 14a of the inner fixing barrel 14. For this reason, the first lens unit moving barrel 16, the third lens unit 3, the stop portion 12, the vibration reduction lens 5, the vibration reduction lens frame 6, the vibration reduction lens driving mechanism 4, and the fifth lens unit moving frame 11 on which these pins 10a, 16b, 4a, and 11a are mounted move along the optical axis I without rotating about the optical axis I, thereby performing a zooming operation. Since the male helicoid threaded portion 16a of the first lens unit moving barrel 16 is meshed with the female helicoid threaded portion 17a of the helicoid barrel 17, the helicoid barrel 17 on which the first lens unit moving frame 8 is mounted moves along the optical axis I together with the first lens unit moving barrel 16. Although the interlocking member 125a moves along the optical axis I together with the vibration reduction lens frame 6 and the vibration reduction lens driving mechanism 4, the abutment portion 24b can come into contact with the straight portion of the interlocking member 125a which extends along the optical axis I.

(Focusing Operation)

In the state shown in FIG. 1, when the distance ring 21 rotates about the optical axis I, the pin portion 21a formed on the distance ring 21 comes into contact with the engaging portion 17c of the helicoid barrel 17. The helicoid barrel 17 then rotates about the optical axis I. The female helicoid threaded portion 17a of the helicoid barrel 17 is meshed with the male helicoid threaded portion 16a of the first lens unit moving barrel 16, and the pin 16b formed on the first lens unit moving barrel 16 is fitted in the straight slot 14a of the inner fixing barrel 14. The first lens unit moving barrel 16 cannot therefore rotate about the optical axis I but moves only along the optical axis I. As a result, the helicoid barrel 17 rotates about the optical axis while meshing with the male helicoid threaded portion 16a of the first lens unit moving barrel 16, and the helicoid barrel 17 on which the first lens unit moving frame 8 is mounted moves along the optical axis I, thereby performing a focusing operation.

The operation of the CPU 137 will be mainly described next to explain the operation of the vibration reduction device according to the embodiment of the present invention.

Figure 10:
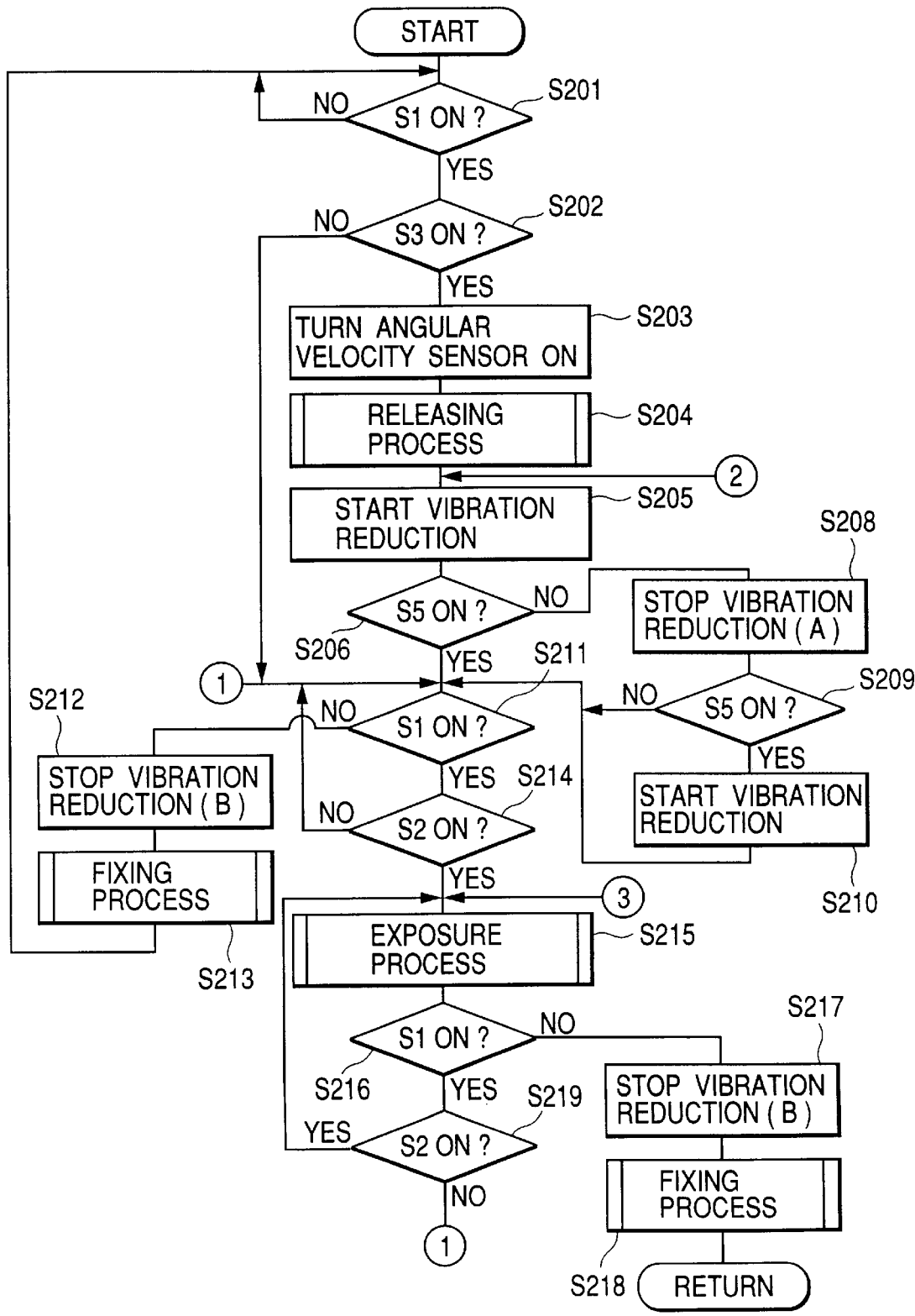
FIG. 10 is a flow chart for explaining the operation of the vibration reduction device according to the embodiment of the present invention.

FIG. 10 is a flow chart for explaining the operation of the vibration reduction device according to the embodiment of the present invention.

When the main switch MSW of the camera body 101 is turned on, the power of the power supply battery 146 is supplied to the CPU 137. The CPU 137 and the CPU 145 then start this flow chart. Note that each step is executed by the CPU 137 unless otherwise specified in the following description.

In step S201, the CPU 145 checks whether the first-stroke switch SW1 is ON. If YES in step S201, the flow advances to step S202. If NO in step S201, the CPU 145 keeps performing the determination step until the first-stroke switch SW1 is turned on.

In step S202, the CPU 137 checks whether the switch SW3 is ON. If it is determined that the switch SW3, which interlocks with the ON/OFF operation of the vibration reduction mode switch 23, is ON, the flow advances to step S203. If NO in step S202, the flow advances to step S211.

In step S203, the CPU 137 turns on the angular velocity sensors 131 and 134. The CPU 137 instructs the angular velocity sensors 131 and 134 to output vibration detection signals on the basis of the ON signal obtained by the first-stroke switch SW1 and supplied from the CPU 145. The angular velocity sensors 131 and 134 detect the vibrations of the camera body 101 and the lens barrel 102, and output vibration detection signals. The CPU 137 calculates vibration reduction amounts on the basis of the vibration detection signals.

In step S204, the CPU 137 instructs the DC motor 32 to release the vibration reduction lens frame 6. This releasing operation will be described later.

In step S205, the CPU 137 instructs the voice coil motors 440 and 441 to start vibration reduction. As shown in FIG. 7, when the locking ring 25 starts rotating in the clockwise direction (d direction in FIG. 7), the projection 25f of the locking ring 25 turns off the detection switch SW4. The CPU 137 generates a vibration reduction start signal on the basis of the OFF signal from the detection switch SW4. The CPU 137 outputs vibration reduction control signals to the voice coil motors 440 and 441 on the basis of the vibration reduction amounts. The voice coil motors 440 and 441 drive the vibration reduction lens 5 by predetermined amounts on the basis of the vibration reduction start signal. The vibration reduction lens 5 then starts vibration reduction.

In the state shown in FIG. 3, when the vibration reduction lens frame 6 receives the thrust PY acting downward along the BY direction from the voice coil motor 440, the vibration reduction lens frame 6 moves on the guide shaft 409 to a lower right position owing to the thrust PY. As shown in FIG. 5, the guide arm 410 rotates about the shaft 411 counterclockwise owing to the thrust PY. As a result, the guide shaft 409 moves parallel to the B direction in FIG. 5 upon rotation of the guide arm 410. Since the steel balls 450, 455, and 460 restrict the movement of the vibration reduction lens frame 6 along the optical axis I, the vibration reduction lens frame 6 moves in the BX and BY directions together with the vibration reduction lens 5. The vibration reduction lens 5 then moves in a direction perpendicular to the optical axis I to reduce the vibrations. In the state shown in FIG. 3, when the vibration reduction lens frame 6 receives a thrust PX acting left along the BX direction from the voice coil motor 441, the vibration reduction lens frame 6 moves on the guide shaft 409 to an upper left position owing to the thrust PX. The guide shaft 409 then moves parallel to a direction (B direction in FIG. 3) perpendicular to the longitudinal direction. The vibration reduction lens frame 6 can move to an arbitrary position within a plane perpendicular to the optical axis I. Note that a vibration reduction state can be observed through the finder (not shown).

In step S206, the CPU 137 checks whether the detection switch SW5 is ON. The CPU 137 checks whether the projection 25f of the locking ring 25 is in contact with the detection switch SW5, and the vibration reduction lens frame 6 is set in the releasing state. If it is determined that the detection switch SW5 is ON, and the vibration reduction lens frame 6 is in the releasing state, the flow advances to step S211. If it is determined that the detection switch SW5 is not ON, the flow advances to step S208.

In step S208, the CPU 137 instructs the voice coil motors 440 and 441 to stop vibration reduction (A). In the state shown in FIG. 8, when the vibration reduction mode switch 23 moves from the ON position to the OFF position, the abutment portion 24b comes into contact with the interlocking member 125a of the locking ring 25. The abutment portion 24b rotates the locking ring 25 in the e direction in FIG. 8 while pushing the interlocking member 125a upward. The detection switch SW5 is turned off immediately after the locking ring 25 starts rotating. Although the upper gear 39a of the gear unit 39 is positioned to mesh with the gear 40, the gear 40 opposes the notched portion 390a of the upper gear 39a and hence can rotate freely. In addition, the pawl portion 41a of the engaging lever 41 rides on the circumferential portion of the projected portion 25g of the locking ring 25. The locking ring 25 can therefore freely rotate in the counterclockwise direction (e direction in FIG. 8). The cam slots 25b, 25c, and 25d of the locking ring 25 guide the pins 29a, 30a, and 31a of the locking members 29, 30, and 31. The locking members 29, 30, and 31 move toward the vibration reduction lens frame 6. As a result, the distal end portions of the pins 29a, 30a, and 31a may come into contact with the vibration reduction lens frame 6 in the process of vibration reduction so as to forcibly fix the vibration reduction lens frame 6. The CPU 137 generates vibration reduction stop signals (centering start signals) on the basis of the OFF signals from the detection switch SW5 to match the optical axis I of the overall photographing optical system with the center of the vibration reduction lens 5. The voice coil motors 440 and 441 drive the vibration reduction lens frame 6 on the basis of the centering start signals to stop/hold the vibration reduction lens frame 6 at the centering position.

In step S209, it is checked whether the detection switch SW5 is ON. When the movement of the vibration reduction mode switch 23 from the ON position to the OFF position is interrupted, and the vibration reduction mode switch 23 is switched to the ON position again, the detection switch SW5 is turned on. As a result, the flow advances to step S210. When the vibration reduction mode switch 23 is stopped between the ON position and the OFF position, or the vibration reduction mode switch 23 is switched to the OFF position, the detection switch SW5 is turned off. The flow therefore advances to step S211.

In step S210, the CPU 137 instructs the voice coil motors 440 and 441 to start vibration reduction. While the detection switch SW5 is ON, the vibration reduction lens frame 6 is in the releasing state. The CPU 137 generates vibration reduction start signals. The voice coil motors 440 and 441 then resume vibration reduction from the centering position.

In step S211, the CPU 145 checks whether the first-stroke switch SW1 is kept on. When the first-stroke switch SW1 is turned off, the flow advances to step S212. If the first-stroke switch SW1 is kept on, the flow advances to step S214.

In step S212, the CPU 137 instructs the voice coil motors 440 and 441 to stop vibration reduction (B). The CPU 137 outputs vibration reduction stop signals to the voice coil motors 440 and 441 on the basis of the OFF signal obtained by the first-stroke switch SW1 and supplied from the CPU 145.

In step S213, the CPU 137 instructs the DC motor 32 to fix the vibration reduction lens frame 6. This fixing operation will be described later.

In step S214, the CPU 145 checks whether the second-stroke switch SW2 is ON. When the second-stroke switch SW2 is turned on after the first-stroke switch SW1 is turned on, the flow advances to step S215. If the second-stroke switch SW2 is OFF, the flow returns to step S211. In step S211, the CPU 145 checks whether the first-stroke switch SW1 is ON.

In step S215, the CPU 145 designates an exposure process. The CPU 145 instructs the shutter mechanism (not shown) to drive. The shutter mechanism then opens/closes the shutter to perform a photographing operation (exposure). The CPU 137 instructs the angular velocity sensors 131 and 134 to output vibration detection signals, and also instructs the voice coil motors 440 and 441 to drive the vibration reduction lens 5, thereby allowing the vibration reduction lens 5 to perform vibration reduction during exposure.

In step S216, the CPU 145 checks whether the first-stroke switch SW1 is kept on. If the first-stroke switch SW1 is OFF, the flow advances to step S217. If the first-stroke switch SW1 is kept on, the flow advances to step S219.

In step S217, the CPU 137 instructs the voice coil motors 440 and 441 to stop vibration reduction (B). The CPU 137 outputs vibration reduction stop signals to the voice coil motors 440 and 441 on the basis of the OFF signal obtained by the first-stroke switch SW1 and supplied from the CPU 145. The voice coil motors 440 and 441 stop the vibration reduction lens 5.

In step S218, the CPU 137 instructs the DC motor 32 to fix the vibration reduction lens 5. This fixing operation will be described later.

In step S219, the CPU 145 checks whether the second-stroke switch SW2 is ON. If both the first-stroke switch SW1 and the second-stroke switch SW2 are ON, the flow returns to step S215. In step S215, the CPU 145 instructs the shutter mechanism (not shown) to perform an exposure process. A photographing operation is continuously performed. If the second-stroke switch SW2 is OFF, the flow advances to step S211 to check whether the first-stroke switch SW1 is ON.

A releasing process in the vibration reduction device according to the embodiment of the present invention will be described next.

Figure 11:
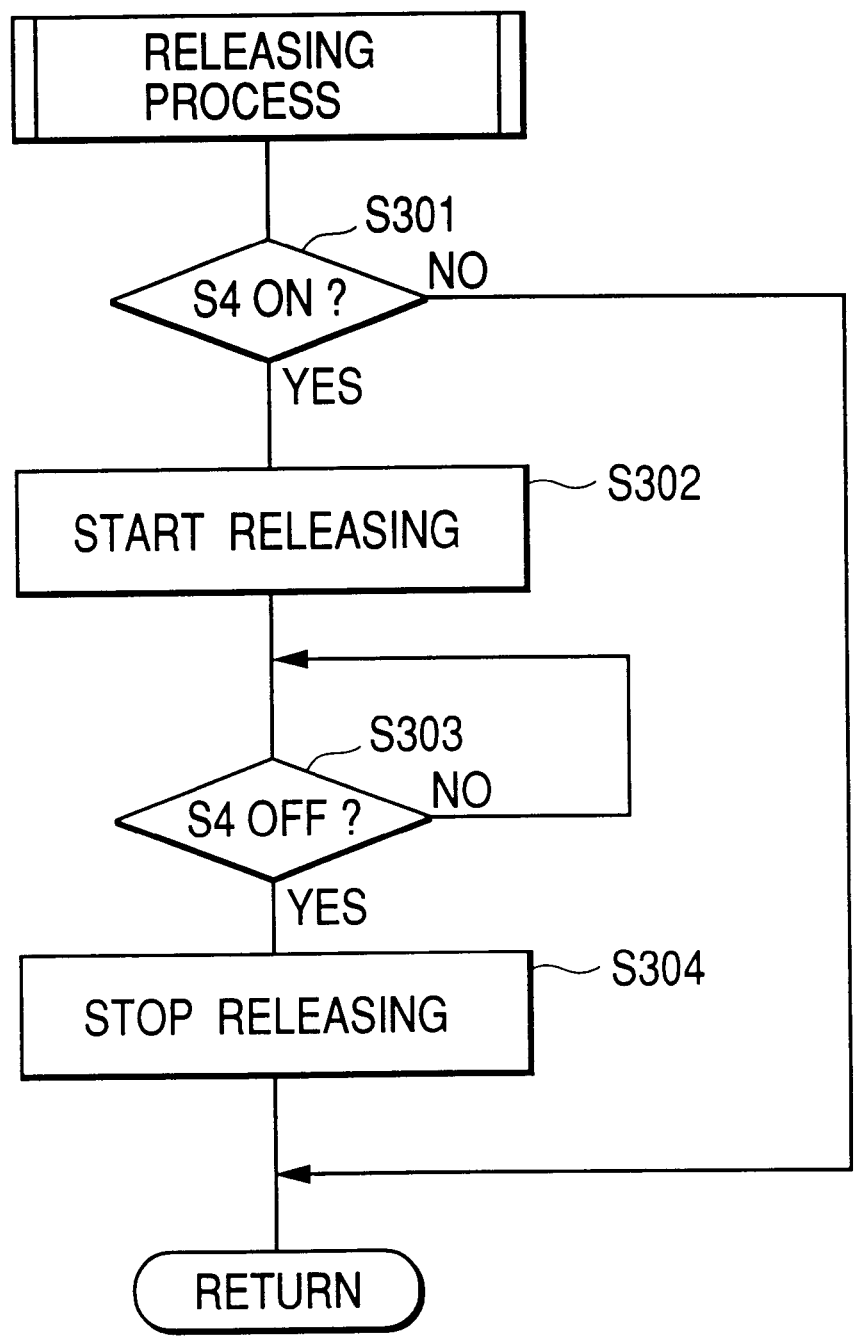
FIG. 11 is a flow chart for explaining the releasing operation of the vibration reduction device according to the embodiment of the present invention.

FIG. 11 is a flow chart for explaining the releasing process in the vibration reduction device according to the embodiment of the present invention.

In step S301, the CPU 137 checks whether the detection switch SW4 is ON. The CPU 137 checks whether the projection 25*f* of the locking ring 25 is in contact with the detection switch SW4, and the vibration reduction lens frame 6 is in the fixing state. If YES in step S301, since the vibration reduction lens frame 6 is in the fixing state, the flow advances to step S302. If NO in step S301, since the vibration reduction lens frame 6 is in the releasing state, the flow returns to the main routine.

In step S302, the CPU 137 instructs the DC motor 32 to release the vibration reduction lens frame 6. As shown in FIG. 7, the pins 29*a*, 30*a*, and 31*a* of the locking members 29, 30, and 31 are in contact with the outer circumferential portion of the vibration reduction lens frame 6 to fix the vibration reduction lens frame 6. In this state, the projection 25*f* of the locking ring 25 keeps the detection switch SW4 on. Although the spring 28 is biasing the locking ring 25 to rotate it clockwise, the pawl portion 41*a* of the engaging lever 41 is hooked on the shoulder 25*k* of the projected portion 25*g* of the locking ring 25 to restrict the rotation of the locking ring 25. The CPU 137 generates a releasing start signal. The DC motor 32 rotates the disengaging gear 38 in the clockwise direction (indicated by the arrow in FIG. 7) on the basis of this releasing start signal. Since the iron piece lever 42 is biased by the spring 44 to rotate about the bearing portion 36*c* of the gear unit 36 counterclockwise, the engaging arm portion 42*c* of the iron piece lever 42 is separated from the pin 38*b* of the disengaging gear 38. The disengaging pin 38*a* of the disengaging gear 38 therefore rotates and pushes aside the arm portion 41*b* of the engaging lever 41, the engaging lever 41 rotates about the support shaft 41*c* counterclockwise against the biasing force of the spring 45. As a result, the pawl portion 41*a* of the engaging lever 41 is disengaged from the shoulder 25*k* of the projected portion 25*g* of the locking ring 25. Since the gear unit 39 is separated from the gear 40, the rotation of the DC motor 32 is not transmitted to the locking ring 25. For this reason, the locking ring 25 is rotated in the clockwise direction (indicated by the arrow in FIG. 7) by the biasing force of the spring 28 at a stroke, and the pins 29*a*, 30*a*, and 31*a* are guided by the cam slots 25*b*, 25*c*, and 25*d*. As a result, the locking members 29, 30, and 31 separate from the outer circumferential portion of the vibration reduction lens frame 6 to release the vibration reduction lens frame 6.

In step S303, the CPU 137 checks whether the detection switch SW4 is OFF. When the locking ring 25 slightly rotates, the detection switch SW4 is turned off. The flow then advances to step S304. If the detection switch SW4 is not OFF, the CPU 137 repeatedly performs the determination step until the detection switch SW4 is turned off, and instructs the DC motor 32 to rotate the disengaging gear 38 until the detection switch SW4 is turned off.

In step S304, the CPU 137 instructs the DC motor 32 to stop the releasing process. The CPU 137 generates a releasing stop signal. The DC motor 32 stops rotating by a short brake on the basis of this releasing stop signal. The flow then returns.

A fixing operation in the vibration reduction device according to the embodiment of the present invention will be described next.

Figure 12:
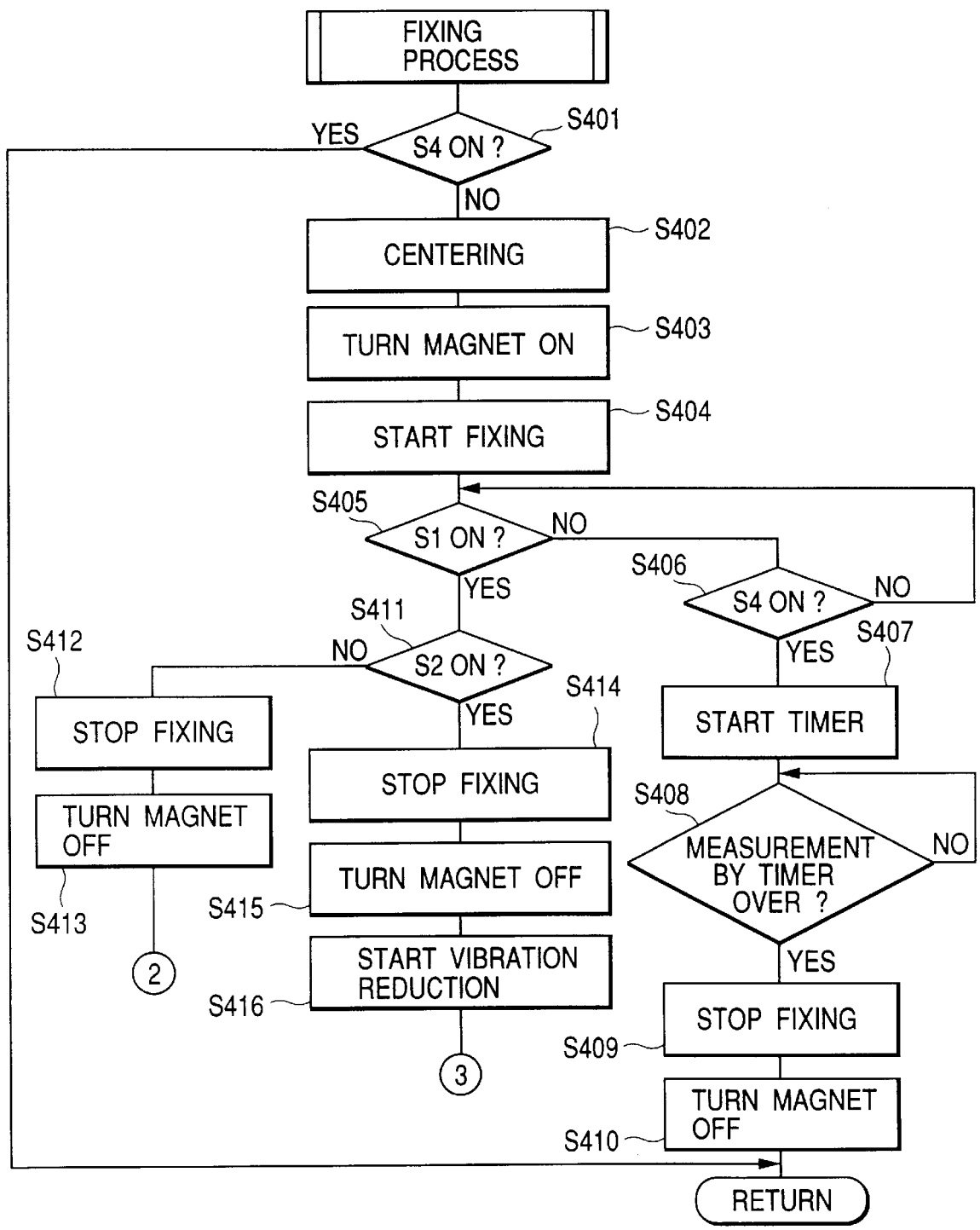
FIG. 12 is a flow chart for explaining the fixing operation of the vibration reduction device according to the embodiment of the present invention.

FIG. 12 is a flow chart for explaining the fixing operation in the vibration reduction device according to the embodiment of the present invention.

In step S401, the CPU 137 checks whether the detection switch SW4 is ON. The CPU 137 checks whether the projection 25*f* of the locking ring 25 is in contact with the detection switch SW4, and the vibration reduction lens frame 6 is in the fixing state. If NO in step S401, since the vibration reduction lens frame 6 is released, the flow advances to step S402. If YES in step S401, since the vibration reduction lens frame 6 is fixed, the flow returns to the main routine.

In step S402, the CPU 137 instructs the voice coil motors 440 and 441 to perform centering. The CPU 137 generates centering start signals on the basis of the OFF signal from the detection switch SW4. The voice coil motors 440 and 441 drive the vibration reduction lens frame 6 to match the optical axis I of the overall photographing optical system with the center of the vibration reduction lens 5 on the basis of the centering start signals. As a result, the vibration reduction lens frame 6 stops at the centering position.

In step S403, the CPU 137 turns on the magnet 27. As shown in FIG. 8, the pins 29a, 30a, and 31a of the locking members 29, 30, and 31 are separated from the outer circumferential portion of the vibration reduction lens frame 6, and hence the vibration reduction lens frame 6 is released. In this state, the projection 25f of the locking ring 25 keeps the detection switch SW5 on. Although the spring 28 is biasing the locking ring 25 to rotate clockwise, the locking ring 25 is at rest with the support portion 125b being in contact with the stopper portion 408a of the frame member 408. The pin 25i of the locking ring 25 has pushed up the arm portion 43b of the seesaw lever 43, and the fork portion 43a of the seesaw lever 43 has rotated about the support shaft 25j counterclockwise to a predetermined position. As a result, the arm portion 42b fitted in the fork portion 43a has rotated about the bearing portion 36c of the gear unit 36 clockwise to a predetermined position, and the iron piece 27a mounted on the arm portion 42a of the iron piece lever 42 is in contact with the attracting surface of the magnet 27. In addition, since the arm portion 42a of the iron piece lever 42 has rotated counterclockwise to a predetermined position, the upper gear 39a of the gear unit 39 has moved to a position where it can engage with the gear 40. The CPU 137 generates a fixing start signal, and energizes the magnet 27. The magnet 27 attracts the iron piece 27a of the iron piece lever 42, and holds the iron piece lever 42 in this state in FIG. 8.

In step S404, the CPU 137 instructs the DC motor 32 to start fixing. The DC motor 32 rotates the gear 40 clockwise on the basis of the releasing start signal output from the CPU 137. The DC motor 32 rotates the locking ring 25 through the gear units 34, 35, 36, and 39 and the gear 40. The locking ring 25 rotates in the counterclockwise direction (e direction in FIG. 8) while the pawl portion 41a rides on the circumferential portion of the projected portion 25g. As a result, the pins 29a, 30a, and 31a of the locking members 29, 30, and 31 are guided by the cam slots 25b, 25c, and 25d to move toward the outer circumferential portion of the vibration reduction lens frame 6. The DC motor 32 rotates the locking ring 25 against the biasing force of the spring 28 to restore the locking ring 25 to the state shown in FIG. 7. The DC motor 32 charges the elastic energy of the spring 28 while rotating the locking ring 25. As shown in FIG. 8, since the disengaging gear 38 also rotates through the gear units 34, 35, 36, and 37, the disengaging gear 38 rotates in the clockwise direction (indicated by the arrow in FIG. 8).

In step S405, the CPU 145 checks whether the first-stroke switch SW1 is ON. If the first-stroke switch SW1 is not turned on again while the DC motor 32 is rotating the locking ring 25, the flow advances to step S406. If the first-stroke switch SW1 is turned on again, the flow advances to step S411.

In step S406, the CPU 137 checks whether the detection switch SW4 is ON. If YES in step S406, since the vibration reduction lens frame 6 is in the fixing state, the flow advances to step S407. If NO in step S406, since the vibration reduction lens frame 6 is not in the fixing state, the flow advances to step S405. The CPU 137 then checks whether the first-stroke switch SW1 is ON.

In step S407, the CPU 137 starts a timer. The CPU 137 starts the built-in timer on the basis of the ON signal from the detection switch SW4 immediately before the fixing process for the vibration reduction lens frame 6 is complete.

In step S408, the CPU 137 checks whether the measurement by the timer is over. If YES in step S408, since the fixing process for the vibration reduction lens frame 6 is complete, the flow advances to step S409. If NO in step S408, the CPU 137 repeatedly performs this determination step.

In step S409, the CPU 137 instructs the DC motor 32 to stop fixing. The DC motor 32 stops rotating within a range in which the upper gear 39a is opposed to the notched portion 390a. The pins 29a, 30a, and 31a come into contact with the outer circumferential portion of the vibration reduction lens frame 6 to fix the vibration reduction lens frame 6. As shown in FIG. 7, the pawl portion 41a of the engaging lever 41 is hooked on the shoulder 25k of the projected portion 25g of the locking ring 25 to hold the locking ring 25. The pin 38b of the disengaging gear 38 is hooked on the engaging arm portion 42c of the iron piece lever 42 to restrict the rotation of the disengaging gear 38.

In step S410, the CPU 137 turns off the magnet 27. The CPU 137 stops energizing the magnet 27. The magnet 27 releases the iron piece 27a of the iron piece lever 42. As shown in FIG. 7, the iron piece lever 42 is then rotated about the bearing portion 36c of the gear unit 36 counterclockwise by the biasing force of the spring 44. As a result, the engaging arm portion 42c of the iron piece lever 42 separates from the pin 38b of the disengaging gear 38. The upper gear 39a of the gear unit 39 moves together with the iron piece lever 42 to be disengaged from the gear 40. However, the pawl portion 41a of the engaging lever 41 is hooked on the projected portion 25g of the locking ring 25, and hence holds the locking ring 25.

In step S411, the CPU 145 checks whether the second-stroke switch SW2 is ON. If NO in step S411, the flow must advance to step S412 to immediately start vibration reduction. When the second-stroke switch SW2 is turned on together with the first-stroke switch SW1, the flow advances to step S414.

In step S412, the CPU 137 instructs the DC motor 32 to stop fixing. The CPU 137 generates a releasing start signal, and deenergizes the DC motor 32 to stop its rotation. As a result, the rotation of the locking ring 25 is stopped, and the fixing operation of the vibration reduction lens frame 6 is stopped.

In step S413, the CPU 137 turns off the magnet 27. The CPU 137 stops energizing the magnet 27 on the basis of the releasing start signal. As shown in FIG. 7, the iron piece lever 42 is rotated counterclockwise by the biasing force of the spring 44. The upper gear 39a of the gear unit 39 is moved together with the iron piece lever 42 to be disengaged from the gear 40. Since the pawl portion 41a of the engaging lever 41 rides on the circumferential portion of the projected portion 25g of the locking ring 25, the locking ring 25 is rotated in the clockwise direction (d direction in FIG. 7) at a stroke by the biasing force of the spring 28, thereby releasing the vibration reduction lens frame 6. The flow then advances to step S205 to start vibration reduction.

In step S414, the CPU 137 instructs the DC motor 32 to stop fixing. The CPU 137 generates a releasing start signal on the basis of the ON signal from the second-stroke switch SW2. The DC motor 32 stops rotating the locking ring 25 on the basis of the releasing start signal, thereby stopping the fixing operation of the vibration reduction lens frame 6.

In step S415, the CPU 137 turns off the magnet 27. When the CPU 137 stops energizing the magnet 27 on the basis of the releasing start signal, the upper gear 39a of the gear unit 39 separates from the gear 40. Since the pawl portion 41a of the engaging lever 41 rides on the circumferential portion of the projected portion 25g of the locking ring 25, the locking ring 25 rotates in the circumferential direction (d direction in FIG. 7) to release the vibration reduction lens frame 6.

In step S416, the CPU 137 instructs the voice coil motors 440 and 441 to start vibration reduction. The voice coil motors 440 and 441 start vibration reduction by driving the vibration reduction lens 5 by predetermined amounts. The flow then advances to step S215, in which the CPU 137 designates an exposure process.

Figure 13:
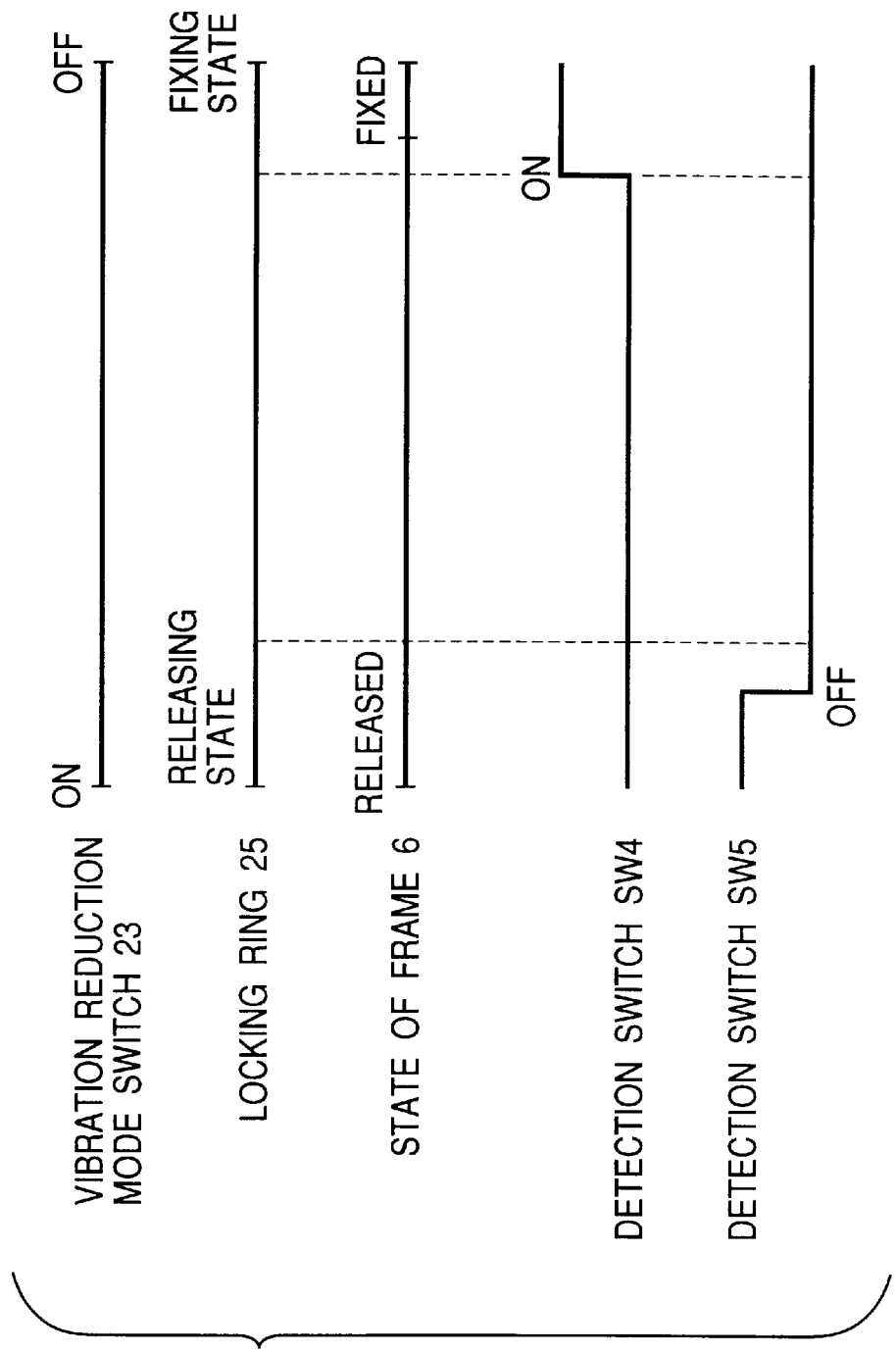
FIG. 13 is a timing chart showing the stroke of the vibration reduction mode switch, the rotation of the locking ring, and the timing of the detection switch.

FIG. 13 shows the timing between the stroke of the vibration reduction mode switch, the rotation of the locking ring, and the operations of the detection switches.

As shown in FIG. 13, when the vibration reduction mode switch 23 moves from the ON position to the OFF position, the locking ring 25 rotates from the position (releasing position) in FIG. 8 to the position (fixing position) in FIG. 7 together with the vibration reduction mode switch 23. At the start of the movement of the vibration reduction mode switch 23, the vibration reduction lens frame 6 is in the releasing state. The detection switch SW5 is turned off while the vibration reduction lens frame 6 maintains its releasing state. After the detection switch SW5 is turned off, the centering operation of the vibration reduction lens frame 6 starts. The movement of the vibration reduction mode switch 23 from the ON position to the OFF position can therefore be detected without any influence of vibration reduction. The detection switch SW4 is turned on immediately before the fixing process for the vibration reduction lens frame 6 is complete.

In the above embodiment of the present invention, when the vibration reduction lens frame 6 is in the releasing state, the vibration reduction mode switch 23 is manually operated from the ON position to the OFF position, the voice coil motors 440 and 441 stop the vibration reduction lens frame 6 at the centering position. For this reason, driving of the vibration reduction lens frame 6 can be quickly stopped, and the vibration reduction lens frame 6 can be held at the centering position. This prevents the outer circumferential portion of the vibration reduction lens frame 6 from coming into contact with the pins 29a, 30a, and 31a of the locking members 29, 30, and 31, and hence prevents vibration reduction from getting out of control.

In the embodiment of the present invention, the interlocking member 125a comes into contact with the abutment portion 24b upon switching operation of the vibration reduction mode switch 23. With this operation, the vibration reduction lens frame 6 can be held in the fixing state. By holding the interlocking member 125a and the abutment portion 24b in contact with each other, releasing of the vibration reduction lens frame 6 can be reliably prevented.

If the lens barrel 102 in the embodiment of the present invention is mounted in a camera body which cannot supply power to the lens barrel 102 side, vibration reduction cannot be performed. According to the embodiment of the present invention, the vibration reduction lens frame 6 can be fixed in interlocking with the movement of the vibration reduction mode switch 23 from the ON position to the OFF position. For this reason, the vibration reduction lens frame 6 can be reliably fixed without any power supply.

In the embodiment of the present invention, the DC motor 32 rotates the disengaging gear 38 to disengage the pawl portion 41a of the engaging lever 41 from the shoulder 25k of the projected portion 25g of the locking ring 25. With this operation, the locking ring 25 can be rotated at a stroke by the biasing force of the spring 28. In the embodiment of the present invention, when the locking ring 25 is rotated by the DC motor 32, the releasing time is about 100 ms. But when the locking ring 25 is rotated by the spring 28, the releasing time can be shorted to about 10 ms. Therefore, the vibration reduction lens frame 6 can be released in a very short time of time, and vibration reduction can be immediately started.

In the embodiment of the present invention, when the vibration reduction lens frame 6 is in the fixing state, the pin 38b of the disengaging gear 38 comes into contact with the engaging arm portion 42c of the iron piece lever 42 to restrict the rotation of the disengaging gear 38. With this operation, when the vibration reduction lens frame 6 is to be released, the start position of the disengaging gear 38 is stabilized, and a releasing process can be quickly and reliably performed.

In the embodiment of the present invention, in the process of fixing the vibration reduction lens frame 6, the upper gear 39a of the gear unit 39 can be separated from the gear 40 by deenergizing the DC motor 32 and the magnet 27. The vibration reduction lens frame 6 can be released by rotating the locking ring 25 at a stroke with the biasing force of the spring 28. In the embodiment of the present invention, when, for example, the second-stroke switch SW2 is turned on in the process of fixing the vibration reduction lens frame 6, the vibration reduction lens frame 6 can be immediately released. With this operation, vibration reduction can be quickly started by the ON operation of the second-stroke switch SW2 regardless of any fixing state of the vibration reduction lens frame 6.

The present invention is not limited to the above embodiment. According to the technical concepts of the present invention, various changes and modification can be made within the spirit and scope of the invention.

For example, although the vibration reduction lens frame 6 is held at the centering position in step S208, the voice coil motors 440 and 441 may stop driving the vibration reduction lens frame 6. Alternatively, the vibration reduction lens frame 6 may be held by the voice coil motors 440 and 441 at the position set when the detection switch SW5 is turned off. Furthermore, although the vibration reduction lens frame 6 is held in the fixing state in interlocking with switching operation of the vibration reduction mode switch 23, the vibration reduction lens frame 6 may be fixed by a dedicated fixing member instead of the vibration reduction mode switch 23.

What is claimed is:

1. A vibration reduction device comprising:
   a vibration reduction optical system which reduces vibration by its movement;
   a fixing portion which assumes a fixing state for fixing said vibration reduction optical system and a releasing state for releasing said vibration reduction optical system;
   a holding portion for holding/canceling the fixing state of said fixing portion; and
   a biasing portion for biasing said fixing portion from the fixing state in which said vibration reduction optical system is fixed to the releasing state in which said vibration reduction optical system is released, said biasing portion being interlocked with a releasing operation of said holding portion to release said vibration reduction optical system.

2. A device according to claim 1, further comprising a restoring portion for restoring said fixing portion from the releasing state in which said vibration reduction optical system is released to the fixing state in which said vibration reduction optical system is fixed, said restoring portion being interlocked with the restoring operation to charge a biasing force of said biasing portion.

3. A device according to claim 2, wherein said biasing portion drives said fixing portion with mechanical energy, and said restoring portion operates with electrical energy and charges mechanical energy of said biasing portion upon the restoring operation of said fixing portion.

4. A device according to claim 2 or 3, further comprising a clutch portion for separating said fixing portion from said restoring portion to allow said vibration reduction optical system to be set in the released state.

5. A device according to claim 1, further comprising a releasing start signal generating unit for generating a releasing start signal, and wherein said holding portion releases said fixing portion on the basis of the releasing start signal.

6. A device according to claim 4, further comprising a fixing start signal generating unit for generating a fixing start signal, and wherein said clutch portion connects said fixing portion to said restoring portion on the basis of the fixing start signal.

7. A device according to claim 6, further comprising a releasing start signal generating unit for generating a releasing start signal, and wherein said clutch portion separates said fixing portion from said restoring portion on the basis of the releasing start signal.

8. A device according to claim 1, further comprising:
 a driving unit for driving said vibration reduction optical system;
 a fixing state determination unit for determining the fixing state of said vibration reduction optical system; and
 a vibration reduction start signal generating unit for generating a vibration reduction start signal,
 wherein said fixing state determination unit instructs said vibration reduction start signal generating unit to generate the vibration reduction start signal upon determining that said vibration reduction optical system is in the released state, and
 said driving unit drives said vibration reduction optical system on the basis of the vibration reduction start signal.

9. A device according to claim 1, further comprising:
 a driving unit for driving said vibration reduction optical system;
 a fixing state determination unit for determining the fixing state of said vibration reduction optical system; and
 a vibration reduction stop signal generating unit for generating a vibration reduction stop signal,
 wherein said fixing state determination unit instructs said vibration reduction stop signal generating unit to generate the vibration reduction stop signal upon determining that said vibration reduction optical system is not in the released state, and
 said driving unit stops driving said vibration reduction optical system on the basis of the vibration reduction stop signal.

10. A device according to claim 1, further comprising:
 a first restoring portion which is electrically energized to restore said fixing portion from the releasing state in which said vibration reduction optical system is released to the fixing state in which said vibration reduction optical system is fixed; and
 a second restoring portion for restoring said fixing portion without electrical energy independently of a restoring operation of said first restoring portion.

11. A device according to claim 10, wherein said biasing portion drives said fixing portion with mechanical energy, and
 said first restoring portion is interlocked with the restoring operation of said first restoring portion to charge the mechanical energy of said biasing portion.

12. A device according to claim 10, wherein said second restoring portion is a manual driving portion to be manually driven.

13. A device according to claim 12, wherein said manual driving portion is an operation mode switching portion for switching between at least a mode of performing vibration reduction and a mode of performing no vibration reduction.

14. A device according to claim 10, further comprising:
 a driving unit for driving said vibration reduction optical system;
 a fixing state determination unit for determining the fixing state of said vibration reduction optical system; and
 a vibration reduction start signal generating unit for generating a vibration reduction start signal;
 wherein said fixing state determination unit instructs said vibration reduction start signal generating unit to generate the vibration reduction start signal upon determining that said vibration reduction optical system is in the released state; and
 said driving unit drives said vibration reduction optical system on the basis of the vibration reduction start signal.

15. A device according to claim 10, further comprising:
 a driving unit for driving said vibration reduction optical system;
 a fixing state determination unit for determining the fixing state of said vibration reduction optical system; and
 a vibration reduction stop signal generating unit for generating a vibration reduction stop signal;
 wherein said fixing state determination unit instructs said vibration reduction stop signal generating unit to generate the vibration reduction stop signal upon determining that said vibration reduction optical system is not in the released state; and
 said driving unit stops driving said vibration reduction optical system on the basis of the vibration reduction stop signal.

* * * * *